US012420564B2

(12) United States Patent
Nakano

(10) Patent No.: US 12,420,564 B2
(45) Date of Patent: Sep. 23, 2025

(54) PRINTING APPARATUS, CONTROL METHOD OF PRINTING APPARATUS, AND NON-TRANSITORY COMPUTER-READABLE STORAGE MEDIUM THEREFOR

(71) Applicant: BROTHER KOGYO KABUSHIKI KAISHA, Nagoya (JP)

(72) Inventor: Yasuhiro Nakano, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 197 days.

(21) Appl. No.: 18/308,053

(22) Filed: Apr. 27, 2023

(65) Prior Publication Data

US 2023/0347662 A1 Nov. 2, 2023

(30) Foreign Application Priority Data

Apr. 27, 2022 (JP) ................................ 2022-073397

(51) Int. Cl.
*B41J 3/60* (2006.01)
*B41J 13/00* (2006.01)

(52) U.S. Cl.
CPC ............ *B41J 3/60* (2013.01); *B41J 13/0045* (2013.01)

(58) Field of Classification Search
CPC . B41J 3/60; B41J 13/0045; B41J 11/70; B41J 11/663
See application file for complete search history.

(56) References Cited

U.S. PATENT DOCUMENTS

2014/0153051 A1* 6/2014 Ma ...................... H04N 1/3872 358/1.18

FOREIGN PATENT DOCUMENTS

JP 2018-186448 A 11/2018
JP 2022056961 A * 4/2022 .......... B41J 11/0095

* cited by examiner

*Primary Examiner* — Douglas X Rodriguez
*Assistant Examiner* — Tracey M McMillion
(74) *Attorney, Agent, or Firm* — KENEALY VAIDYA LLP

(57) ABSTRACT

A printing apparatus includes an image printer, a first conveying mechanism configured to convey a printing medium in a first conveying direction, a second conveying mechanism configured to convey the printing medium in a second conveying, a cutting mechanism configured to cut the printing medium into n equal pieces, and a controller. The controller is configured to perform a first conveying process of conveying the printing medium in the first conveying direction to print on a front surface of the printing medium, a second conveying process of conveying the printing medium in the second conveying direction to print on a back surface of the printing medium, an image printing process of printing the page images on the front and back surface in a page number order, and a first cutting process of cutting the printing medium on which the last page image is printed.

12 Claims, 15 Drawing Sheets

1006

DA1

| IMAGE DATA | CONTENT OF IMAGE DATA |
|---|---|
| IMAGE DATA A | PAGE IMAGE OF FIRST PAGE |
| IMAGE DATA B | PAGE IMAGE OF SECOND PAGE |
| IMAGE DATA C | PAGE IMAGE OF THIRD PAGE |
| IMAGE DATA D | PAGE IMAGE OF FOURTH PAGE |
| IMAGE DATA E | PAGE IMAGE OF FIFTH PAGE |

P01

| IMAGE DATA | PRINT ORDER ON PRINTING SHEET P |
|---|---|
| IMAGE DATA A | 5 |
| IMAGE DATA B | 2 |
| IMAGE DATA C | 4 |
| IMAGE DATA D | 3 |
| IMAGE DATA E | 1 |

FIG. 9A

1007

DA2

| IMAGE DATA | CONTENT OF IMAGE DATA |
|---|---|
| IMAGE DATA A | PAGE IMAGE OF FIFTH PAGE |
| IMAGE DATA B | PAGE IMAGE OF SECOND PAGE |
| IMAGE DATA C | PAGE IMAGE OF FOURTH PAGE |
| IMAGE DATA D | PAGE IMAGE OF THIRD PAGE |
| IMAGE DATA E | PAGE IMAGE OF FIRST PAGE |

P02

| IMAGE DATA | PRINT ORDER ON PRINTING SHEET P |
|---|---|
| IMAGE DATA A | 1 |
| IMAGE DATA B | 2 |
| IMAGE DATA C | 3 |
| IMAGE DATA D | 4 |
| IMAGE DATA E | 5 |

FIG. 9B

1008

DA3

| IMAGE DATA | CONTENT OF IMAGE DATA |
|---|---|
| IMAGE DATA A | PAGE IMAGE OF FIRST PAGE + PAGE IMAGE OF SECOND PAGE |
| IMAGE DATA B | PAGE IMAGE OF THIRDPAGE + PAGE IMAGE OF FOURTH PAGE |
| IMAGE DATA C | PAGE IMAGE OF FIFTH PAGE + BLANK PAGE IMAGE |

P03

| IMAGE DATA | CONTENT OF IMAGE DATA | PRINT ORDER ON PRINTING SHEET P |
|---|---|---|
| IMAGE DATA A1 | PAGE IMAGE OF FIRST PAGE | 5 |
| IMAGE DATA A2 | PAGE IMAGE OF SECOND PAGE | 2 |
| IMAGE DATA B1 | PAGE IMAGE OF THIRD PAGE | 4 |
| IMAGE DATA B2 | PAGE IMAGE OF FOURTH PAGE | 3 |
| IMAGE DATA C1 | PAGE IMAGE OF FIFTH PAGE | 1 |

FIG. 9C

PRINTING APPARATUS, CONTROL METHOD OF PRINTING APPARATUS, AND NON-TRANSITORY COMPUTER-READABLE STORAGE MEDIUM THEREFOR

REFERENCE TO RELATED APPLICATIONS

This application claims priority under 35 U.S.C. § 119 from Japanese Patent Application No. 2022-073397 filed on Apr. 27, 2022. The entire subject matter of the application is incorporated herein by reference.

BACKGROUND ART

The present disclosures relate to a printing apparatus, a control method of the printing apparatus, and a non-transitory computer-readable storage medium containing computer-executable instructions therefor.

There have been known image forming apparatuses (e.g., printing apparatuses) equipped with a cutting mechanism configured to cut out a printing medium. Among such image forming apparatuses, there is known a printing apparatus configured to perform printing on a printing media and then cut the print media with the cutting mechanism to generate two print media, on each of which an image is printed, and discharge the same from the printing apparatus.

DESCRIPTION

In a conventional printing apparatus as described above, a case where images are formed on both surfaces (i.e., a front surface and a back surface) is not considered.

According to aspects of the present disclosure, there is provided a printing apparatus including an image printer configured to print a page image on a printing medium based on print data including a plurality of pieces of image data, each of the plurality of image data indicating a page image, a first conveying mechanism configured to convey the printing medium on which the page image is printer in a first conveying direction, the first conveying direction being a direction the printing medium is discharged to a discharge part, a second conveying mechanism configured to convey the printing medium in a second conveying direction opposite to the first direction, a cutting mechanism arranged on a downstream side of the image printer, the cutting mechanism being configured to cut the printing medium into n equal pieces, the n being an integer equal to or more than 2, and a controller. The controller is configured to perform a first conveying process of causing the first conveying mechanism to convey the printing medium in the first conveying direction to print the page image on a front surface of the printing medium, a second conveying process of causing the second conveying mechanism to convey the printing medium in the second conveying direction to print the page image on a back surface of the printing medium after the first conveying process, an image printing process of causing the image printer to print the page images on each of the front surface and the back surface cut by the cutting mechanism in a page number order, with page numbers decreasing sequentially as the printing medium is discharged to the discharge part, the page image being printed on the front surface and the back surface of the printing medium discharged to the discharge part in the page number order specified by the print data, and a first cutting process of, while the first conveying process, causing the cutting mechanism to cut the printing medium on which a last page image corresponding to a last page number of the print data is to be printed when a number of pages of the page images included in the print data is not divisible by 2n.

According to aspects of the present disclosure, there is provided a control method of a printing apparatus printing apparatus including an image printer configured to print a page image on a printing medium based on print data including a plurality of pieces of image data, each of the plurality of image data indicating a page image, a first conveying mechanism configured to convey the printing medium on which the page image is printer in a first conveying direction, the first conveying direction being a direction the printing medium is discharged to a discharge part, a second conveying mechanism configured to convey the printing medium in a second conveying direction opposite to the first direction, a cutting mechanism arranged on a downstream side of the image printer, the cutting mechanism being configured to cut the printing medium into n equal pieces, the n being an integer equal to or more than 2, and a controller. The control method comprises a first conveying process of causing the first conveying mechanism to convey the printing medium in the first conveying direction to print the page image on a front surface of the printing medium, a second conveying process of causing the second conveying mechanism to convey the printing medium in the second conveying direction to print the page image on a back surface of the printing medium after the first conveying process, an image printing process of causing the image printer to print the page images on each of the front surface and the back surface cut by the cutting mechanism in a page number order, with page numbers decreasing sequentially as the printing medium is discharged to the discharge part, the page image being printed on the front surface and the back surface of the printing medium discharged to the discharge part in the page number order specified by the print data, and a first cutting process of, while the first conveying process, causing the cutting mechanism to cut the printing medium on which a last page image corresponding to a last page number of the print data is to be printed when a number of pages of the page images included in the print data is not divisible by 2n.

According to aspects of the present disclosure, there is provided a non-transitory computer-readable storage medium for a printing apparatus printing apparatus including an image printer configured to print a page image on a printing medium based on print data including a plurality of pieces of image data, each of the plurality of image data indicating a page image, a first conveying mechanism configured to convey the printing medium on which the page image is printer in a first conveying direction, the first conveying direction being a direction the printing medium is discharged to a discharge part, a second conveying mechanism configured to convey the printing medium in a second conveying direction opposite to the first direction, a cutting mechanism arranged on a downstream side of the image printer, the cutting mechanism being configured to cut the printing medium into n equal pieces, the n being an integer equal to or more than 2, and a controller. The non-transitory computer-readable storage medium containing computer-executable instructions which cause, when executed by the controller, the printing apparatus to perform causing the first conveying mechanism to convey the printing medium in the first conveying direction to print the page image on a front surface of the printing medium, causing the second conveying mechanism to convey the printing medium in the second conveying direction to print the page image on a back surface of the printing medium after the first conveying process, causing the image printer to print the page images on each of the front surface and the back surface cut by the cutting mechanism in a page number order, with page numbers decreasing sequentially as the printing medium is discharged to the discharge part, the page image being printed on the front surface and the back surface of the printing medium discharged to the discharge part in the page number order specified by the print data, and causing the cutting mechanism to cut the printing medium on which a last page image corresponding to a last page number of the print data is to be printed while the first conveying process when a number of pages of the page images included in the print data is not divisible by 2n.

FIGS. 9A-9C illustrate contains of print data and the order of page images to be printed on printing sheets.

Hereinafter, referring to the accompanying drawings, a printing apparatus 1 according to an embodiment of the present disclosures will be described.

Figure 1:
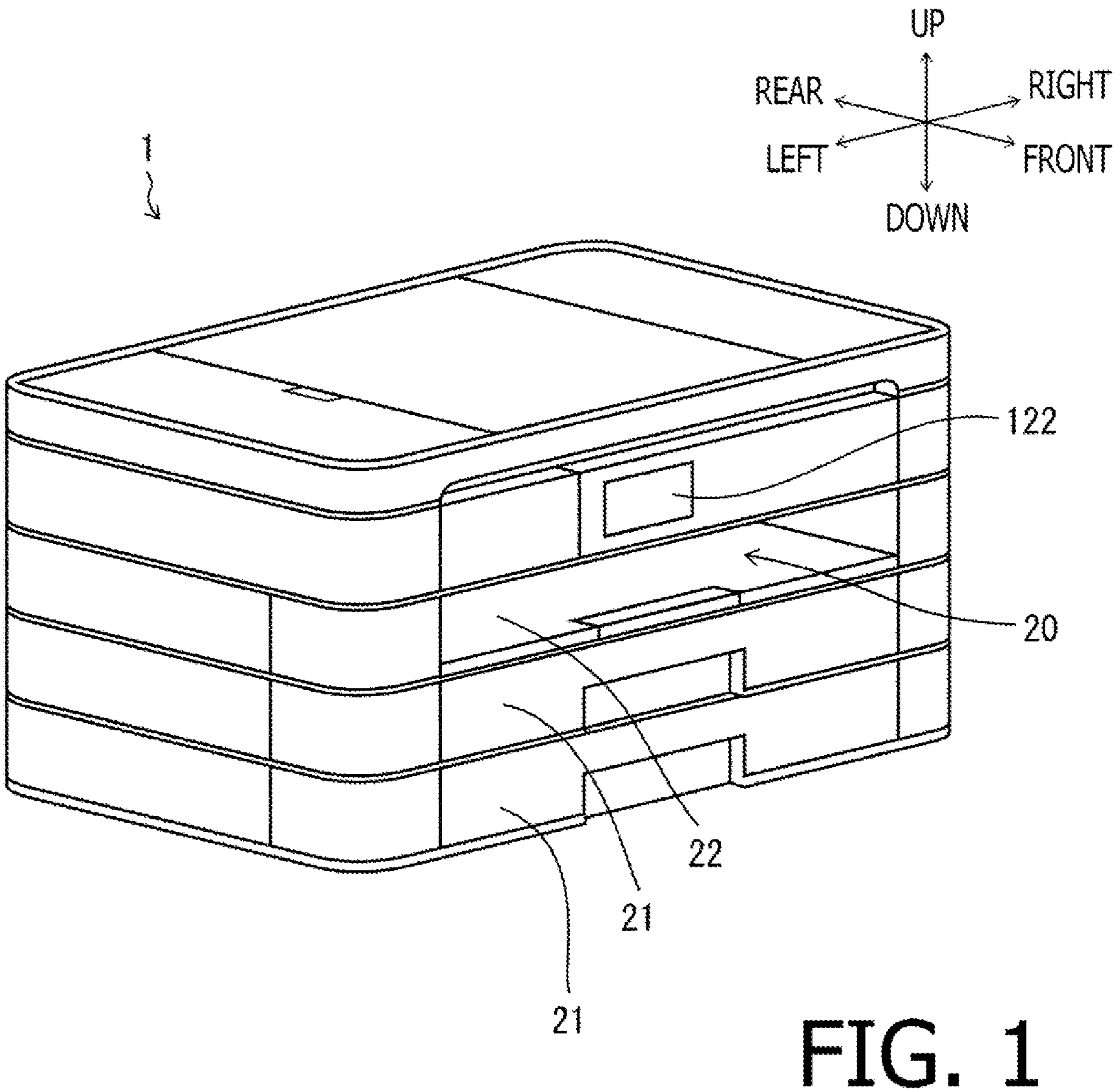
FIG. 1 is a perspective view of a printing apparatus according to an embodiment of the present disclosures.
Figure 2:
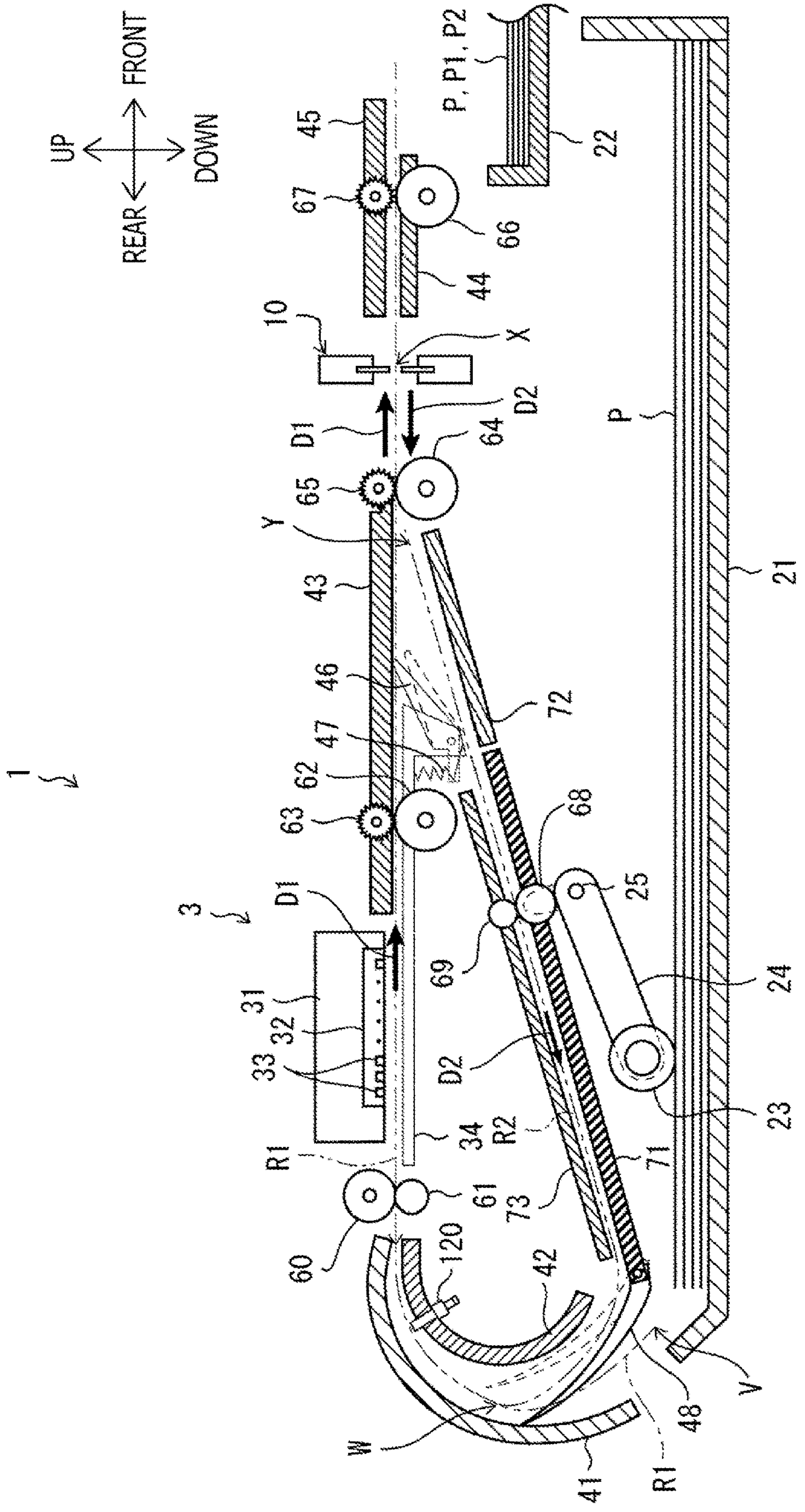
FIG. 2 is a cross-sectional side view schematically showing an internal structure of the printing apparatus.

FIG. 1 is a perspective view, and FIG. 2 is a cross-sectional side view of the printing apparatus 1. It is noted that, in the following description, as the printing apparatus 1, a monochromatic printer configured to perform an image printing process to print monochromatic images will be described. However, aspects of the present disclosures are not necessarily limited to the monochromatic printer but, for example, a color printer configured to print full-colored image may be used as the printing apparatus 1.

According to the present embodiment, the printing apparatus 1 is an MFP (multifunction printer) having multiple functions such as a scan function, a print function, a copy function and a facsimile function. Further, in the following description, directions (i.e., up, down, right, left, front and rear directions) of the printing apparatus 1 are defined with reference to a state of the printing apparatus 1 shown in FIG. 1, which shows a state where the printing apparatus 1 is installed for use.

As shown in FIG. 1, the printing apparatus 1 has a housing having a substantially rectangular parallelepiped shape. The printing apparatus 1 constitutes an inkjet printer that performs an image printing process by, for example, ejecting ink based on print data specified by a print job onto a printing sheet P, which is an example of a print medium according to aspects of the present disclosures. It should be noted that the printing apparatus 1 may be a laser printer configured to record an image on the printing sheet in accordance with an electrophotographic imaging method. Further, as printing medium, not only a paper medium (e.g., the printing sheets) but also resin medium (e.g., OHP sheets) made of plastic.

As shown in FIG. 1, on a front face of the printing apparatus 1, an opening 20 is formed. At the opening 20, a sheet feed tray 21 and a discharge tray 22 are detachably/attachably arranged. The sheet feed tray 21 is a tray configured to accommodate multiple printing sheets P, and an upper face thereof is opened. In an example shown in FIG. 1, two sheet feed trays 21 are arranged in an up-down direction. The up-side sheet feed tray 21 accommodates, for example, A4-size printing sheets P, while the low-side sheet feed tray 21 accommodates, for example, A3-size printing sheets P.

As also shown in FIG. 2, on an upper side with respect to the up-side sheet feed tray 21, a discharge tray 22, which is an example of a discharge part, is arranged. The discharge tray 22 is for accommodating the printing sheets P, first printing sheets P1, and second printing sheets P2 discharged by a conveying roller 66, and configured such that the upper face is opened. It is noted that, in an example shown in FIG. 2, the low-side sheet feed tray 21 is not shown for the sake of explanation.

Further, on the front face of the printing apparatus 1, an operation panel 122 having a display screen is provided. The operation panel 122 includes, for example, a touchscreen panel, and is configured to receive user's operation, regarding the printing apparatus 1, to touch the touchscreen panel. The operation panel 122 receives, for example, settings of the size of the printing sheet P, a selection whether to perform a cutting process to cut the printing sheet P or not. Information set through the operation panel 122 is output to a controller 100 (see FIG. 3).

As shown in FIG. 2, the printing apparatus 1 has a sheet feed roller 23, a first conveying passage R1, conveying rollers 60, 63, 64, 66 and 68, a first flap 46, a second flap 48, a second conveying passage R2, and a cutting mechanism 10. The conveying rollers 60, 62, 64 and 66 are examples of a first conveying mechanism according to aspects of the present disclosures. Further, the conveying rollers 64, 66 and 68 are examples of a second conveying mechanism according to aspects of the present disclosures. Further, the number of rollers provided to the first conveying passage R1 and the second conveying passage R2 can be changed as needed. For example, the conveying roller 66 may be omitted.

The sheet feed roller 23 is a roller for feeding one of the sheets P accommodated in the sheet feed tray 21 to a conveying start position V. The sheet feed roller 23 is rotatably supported at a front end part of a feed arm 24. The feed arm 24 is rotatably supported by a shaft 25 that is supported by a frame of the printing apparatus 1. The sheet feed roller 23 forwardly (i.e., clockwise in FIG. 2) rotates as a sheet feed motor 107 (see FIG. 3) is driven. As the sheet feed roller 23 forwardly rotates, the printing sheets P accommodated in the sheet feed tray 21 is fed, one by one, to the conveying start position V in the first conveying passage R1.

The first conveying passage R1 extends upward from a rear end of the sheet feed tray 21, curves in an area sectioned by guide members 41 and 42, passes through the position of a print engine 3, and straightens in an area sectioned by the guide members 43, 44, and 45 to the discharge tray 22. In the following description, a first conveying direction D1 is a direction in which the printing sheet P is discharged the discharge tray 22, that is, a direction directed from the print engine 3 toward the discharge tray 22. Further, a second conveying direction D2 is a conveying direction of the printing sheet P opposite to the first conveying direction D1.

In other words, the first conveying passage R1 is a conveying passage for conveying the printing sheet P in the first conveying direction D1. The second conveying passage R2 is a conveying passage for conveying the printing sheet P switched back from the first conveying passage R1, in the second conveying direction D2. The printing sheet P conveyed in the second conveying direction D2 is conveyed toward the first conveying passage R1 with its front and back surfaces reversed at a joining position W. In this way, a page image can be printed on the back surface of the printing sheet P with the print engine 3. It is noted that, in the following description, a process of conveying the printing sheet P in the second conveying direction D2 may be referred to as a switchback process SB. The switchback process SB is an example of a second conveying process according to aspects of the present disclosures.

In the first conveying passage R1, the conveying roller 60 is arranged upstream of the print engine in the first conveying direction D1. At a position facing a lower part of the conveying roller 60, a pinch roller 61 is arranged. The conveying roller 60 is driven by a conveying motor 108 (see FIG. 3). The pinch roller 61 rotates in association with a rotation of the conveying roller 60. When the conveying roller 60 and the pinch roller 61 forwardly rotate, the printing sheet P is conveyed to the print engine 3 with being nipped by the conveying roller 60 and the pinch roller 61.

The print engine 3 is arranged between the conveying roller 60 and the conveying roller 62 in the first conveying passage R1, and prints an image on the printing sheet P. The print engine 3 is an example of an image printer according to aspects of the present disclosures. The print engine 3 has a carriage 31, a recording head 32, nozzles 33 and a platen 34. The recording head 32 is mounted on the carriage 31. On a bottom surface of the recording head 32, multiple nozzles 33 are formed. The recording head 32 is configured to eject ink droplets from the nozzles 33. The platen 34 is a rectangular planer member on which the printing sheet P is placed. On the printing sheet P supported by the platen 34, the nozzles 33 selectively eject ink droplets to the printing sheet P supported by the platen in the process of movement of the carriage 31, thereby an image being printed on the printing sheet P.

The driving force of a carriage motor 109 (see FIG. 3) is transmitted to the carriage 31, thereby the carriage 31 reciprocally moves in a direction perpendicular to the first conveying direction D1, that is, in a width direction of the printing sheet P. The controller 100 repeatedly performs an image printing process of controlling the nozzles 33 to eject ink droplets while moving the carriage 31 in the width direction of the printing sheet P in a state where the conveyance of the printing sheet P is stopped to print one line of image on the printing sheet P, and a line-feed process of driving the conveying rollers 60 and 62 to convey the printing sheet P by a particular line-feed amount, to print an entire image on the printing sheet P.

As shown in FIG. 2, on the downstream side, in the first conveying direction, with respect to the print engine 3 in the first conveying passage R1, the conveying roller 62 is arranged. At a position facing an upper part of the conveying roller 62, a spur roller 63 is arranged. The conveying roller 62 is driven by the conveying motor 108 (see FIG. 3). The spur roller 63 rotates in association with the rotation of the conveying roller 62. As the conveying roller 62 and the spur roller 63 forwardly rotate, the printing sheet P is nipped by the conveying roller 62 and the spur roller 63, and conveyed downstream in the first conveying direction D1.

On the downstream side, in the first conveying direction D1, with respect to the conveying roller 62, the conveying roller 64 is arranged. At a position facing an upper part of the conveying roller 64, a spur roller 65 is arranged. The conveying roller 64 is driven by the conveying motor 108. The spur roller 65 rotates in association with the rotation of the conveyor roller 64. As the conveying roller 64 and the spur roller 65 forwardly rotate, the printing sheet P is nipped by; the conveying roller 64 and the spur roller 65 and conveyed toward the cutting mechanism 10. On the other hand, when the conveying roller 64 and the spur roller 65 reversely rotate, the printing sheet P is nipped by the conveying roller 64 and the spur roller 65, while conveyed toward the second conveying passage R2 along a lower surface of the first flap 46.

Between the conveying rollers 62 and 64, in the first conveying passage R1, the first flap 46 is provided. The first flap 46 is arranged near a branch position Y facing the guide member 43. The first flap 46 is rotatably supported by the platen 34 to be in between first and second states. In the first state, which is a state where the first flap 46 is located at a position shown by solid lines in FIG. 2, the first flap 46 contacts the guide member 43 to close the first conveying passage R1. On the other hand, in the second state which is a state where the flap 46 is located at a position shown by the dotted line in FIG. 2, the first flap 46 is located at a position lower than the position in the first state and is spaced apart from the guide member 43 to allow the printing sheet P conveyed in the first conveying direction D1 to pass therethrough.

The first flap 46 is urged upward by a coil spring 47. One end of the coil spring 47 is connected to the first flap 46, and the other end of the coil spring 47 is connected to the platen 34. The first flap 46 is in the first state as urged by the coil spring, and a front end of the first flap 46 contacts the guide member 43.

The cutting mechanism 10 is arranged, in the first conveying passage R1, between the conveying roller 64 and the conveying roller 66. The cutting mechanism 10 is arranged downstream from the print engine 3 in the first conveying direction D1. The cutting mechanism 10 is a well-known cutter mechanism that has a pair of upper and lower blades and a cutter carriage, and is configured to cut the printing sheet P with the upper and lower blades. Concretely, the cutting mechanism (cutting mechanism) 10 is configured to cut the printing sheet P at a particular position by moving the cutter carriage in the width direction of the printing sheet P. The cutting mechanism 10 is configured to cut the printing sheet P into n equal pieces. It is noted that the cutting mechanism 10 may be configured with only one blade on either the upper or lower side.

Figure 3:
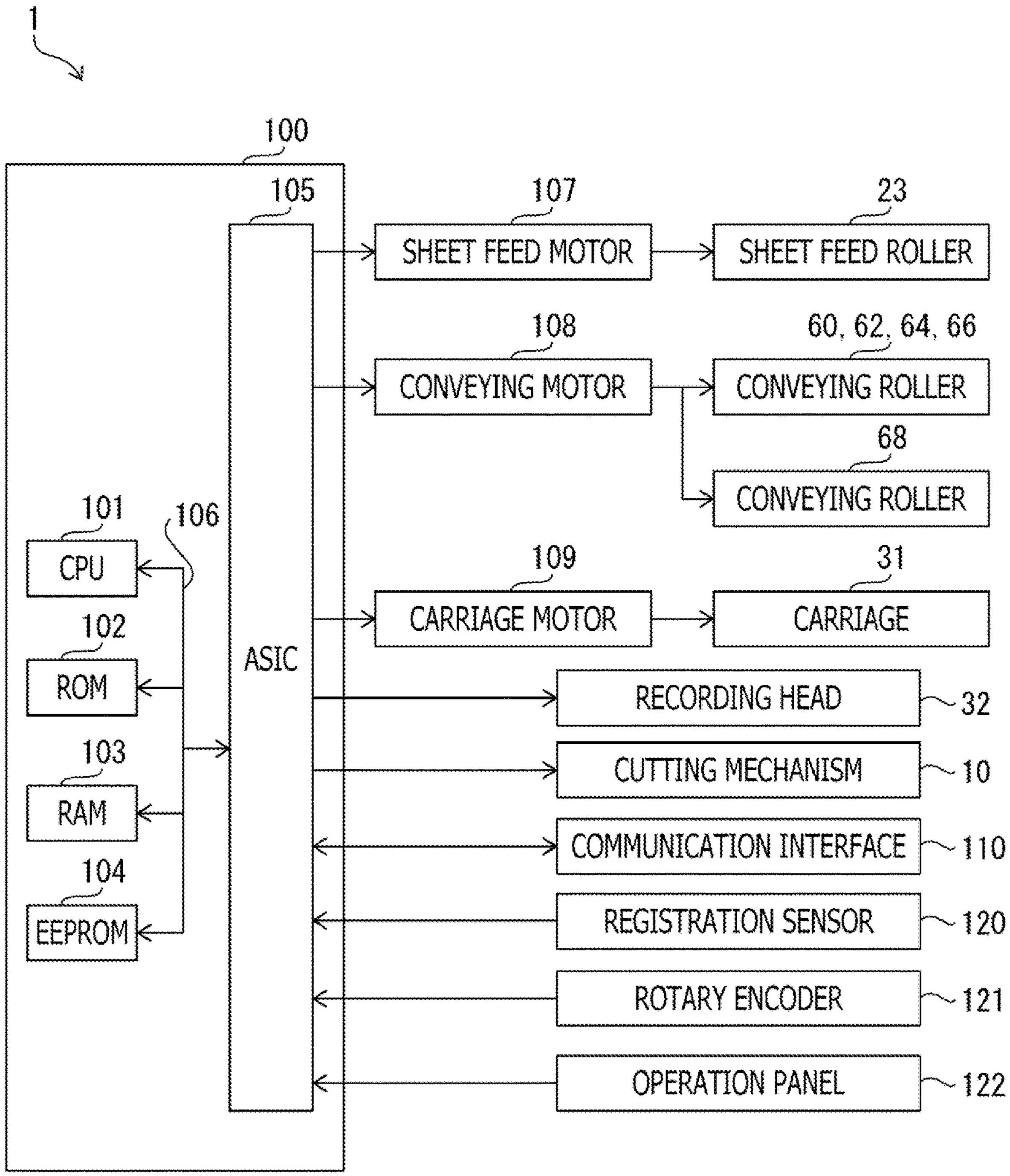
FIG. 3 is a block diagram of the printing apparatus.

The conveying roller 66 is arranged downstream of the cutting mechanism 10 in the first conveying passage R1 in the first conveying direction D1. At a position facing an upper part of the conveying roller 66, a spur roller 67 is arranged. The conveying roller 66 is driven by the conveying motor 108 (FIG. 3). The spur roller 67 rotates in association with the rotation of the conveying roller 66. As the conveying roller 66 and the spur roller 67 rotate forward, the printing sheet P, a first printing sheet P1, and a second printing sheet P2 are conveyed by the conveying roller 66 and discharged to the discharge tray 22.

As shown in FIG. 2, the second flap 48 is rotatably arranged at the joining position W of the first conveying passage R1 and the second conveying passage R2. Concretely, the second flap 48 is rotatable between a position in the first state, shown in FIG. 2 by solid lines, and a position in the second state, shown in FIG. 2 by dotted lines. When the second flap 48 is in the first state, the second flap 48 and the guide member 42 constitute a part of the second conveying passage R2. When the second flap 48 is in the second state, the second flap 48 and the guide member 41 form a part of the first conveying passage R1.

A registration sensor 120 is provided upstream of the conveying roller 60 in the first conveying passage R1. The registration sensor 120 is a sensor configured to detect when a leading or trailing edge of the printing sheet P passes a point of contact with the conveying roller 60. As the registration sensor 120, a sensor with an actuator that oscillates when contacted by the printing sheet P, an optical sensor, or the like can be used.

The registration sensor 120 is configured to output an ON signal when the printing sheet P passes the position of the registration sensor 120, and an OFF signal when the printing sheet P does not pass the position of the registration sensor 120. That is, the registration sensor 120 outputs an ON signal from a timing when the leading edge of the printing sheet P reaches the position of the registration sensor 120 until the trailing edge of the printing sheet P passes the position of the registration sensor 120, and outputs an OFF signal during the rest of the time. The detection signal detected by the registration sensor 120 is output to the controller 100.

The conveying roller 60 is equipped with a rotary encoder 121 (FIG. 3) configured to detect the rotation of the conveying roller 60. The rotary encoder 121 is configured to output pulse signals to the controller 100 in response to the rotation of the conveying roller 60. The rotary encoder 121 is of a well-known structure, and has an encoder disk and an optical sensor. The encoder disk rotates with the rotation of the conveying roller 60. The optical sensor is configured to read the rotating encoder disk, generate pulse signals, and output the generated pulse signals to the controller 100.

The second conveying passage R2 is a passage sectioned by guide members 71, 72, and 73, the conveying roller 68, and the pinch roller 69. The second conveying passage R2 branches off from the branch position Y upstream from the conveying roller 64 in the first conveying passage R1 and is connected to the joining position W upstream from the print engine 3 in the first conveying passage R1 in the first conveying direction D1. In this way, it is possible to print images on both surfaces of the printing sheet P.

Electrical Configuration of Printing Apparatus 1

FIG. 3 is a block diagram showing an electrical configuration of the printing apparatus 1 shown in FIG. 1. As shown in FIG. 3, the printing apparatus 1 is equipped with a sheet feed motor 107, the conveying motor 108, the carriage motor 109, the controller 100, and a communication interface 110, in addition to the above-mentioned components.

The controller 100 has a CPU (Central Processing Unit) 101, a ROM (Read Only Memory) 102, a RAM (Random Access Memory) 103, an EEPROM (registered trademark of Renesas Electronics) 104, and an ASIC 105, which are interconnected via an internal bus 106. The ROM 102 contains programs and other data for the CPU 101 to control various operations. The RAM 103 is used as a storage area to temporarily record data, signals, and the like that are used when the CPU 101 executes the above program, and/or as a work area for data processing. In the EEPROM 104, setting information that should be retained after the power is turned off is stored. The controller 100 is configured to control the sheet feed motor 107, the conveying motor 108, the carriage motor 109, a recording head 32 and the cutting mechanism 10, and the like.

The ASIC 105 is connected to the sheet feed motor 107, the conveying motor 108, the carriage motor 109, the recording head 32, the cutting mechanism 10, the communication interface 110, the registration sensor 120, the rotary encoder 121, and the operation panel 122. The ASIC 105 is configured to supply drive current to the sheet feed motor 107, the conveying motor 108, and the carriage motor 109. The controller 100 is configured to control the rotation of the sheet feed motor 107, the conveying motor 108, and the carriage motor 109, for example, by a PWM (Pulse Width Modulation) control.

Further, the controller 100 is configured to apply driving voltage to the oscillating elements of the recording head 32 to eject ink droplets from the nozzles 33. Further, to the ASIC 105, the registration sensor 120 and the rotary encoder 121 are connected. The controller 100 is configured to detect the status of the printing apparatus 1 based on the signals output from the registration sensor 120 and the rotary encoder 121.

Concretely, the controller 100 is configured to detect that the printing sheet P has passed the contact position with the conveying roller 60 based on the detection signal output from the registration sensor 120. Further, the controller 100 is configured to detect the amount of rotation of the conveying roller 60 based on the pulse signal output from the rotary encoder 121. Furthermore, the controller 100 is configured to estimate a conveyed amount of the printing sheet P in the first conveying passage R1 based on the pulse signal output from the rotary encoder 121 after the ON signal is output from the registration sensor 120.

The communication interface 110 has, for example, a USB interface, a LAN interface, and a communication interface. To the USB interface, a USB memory stick, a USB cable, and the like are connected. To the LAN interface, an external device (e.g., a computer terminal device) of the printing apparatus 1 is connected via a LAN cable. To the communication interface, an external device such as a portable information terminal is connected via a wireless format network.

When receiving a print job via the communication interface 110, the controller 100 controls the respective components of the printing apparatus 1 to execute an image printing process of printing print data specified by the print job on the printing sheet P. Further, the controller 100 executes a cutting process of cutting the printing sheet P, an image printing process to realize duplex printing, and the like, according to the received print job.

Example of Operation of Printing Apparatus 1

Hereinafter, referring to FIGS. 4-9C, an example of an operation of the printing apparatus 1 will be described. It is noted that, in the following description, the cutting process of cutting printing sheet P and the image printing process of realizing the duplex printing on the printing sheet P are mainly explained. Further, in the following explanation, the case in which an A4 size printing sheet P is cut into an A5 size first printing sheet P1 and an A5 size second printing sheet P2 in the cutting process will be described as an example. That is, in the present embodiment, it is described that the cutting mechanism 10 divides the printing sheet P into two equal parts (n=2).

Figure 4:
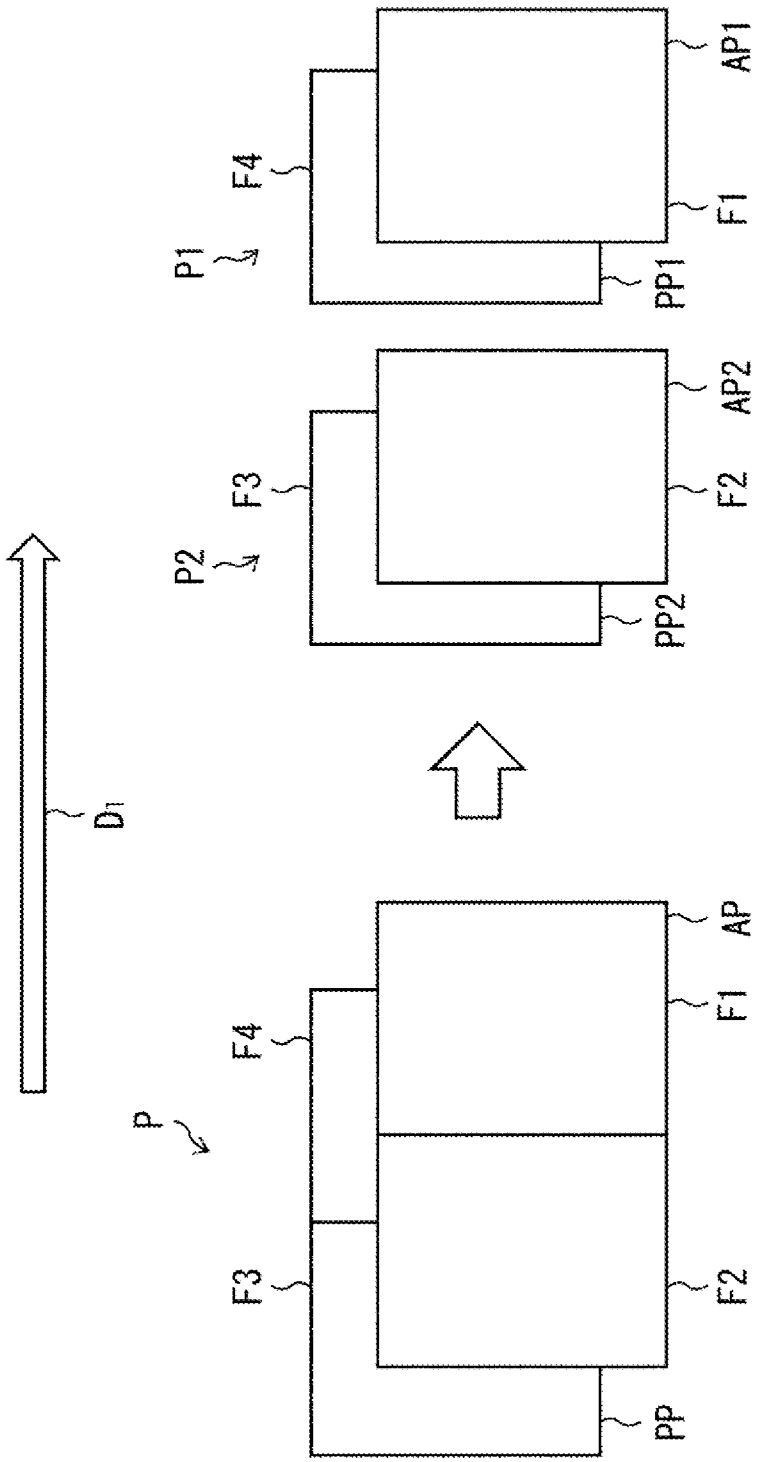
FIG. 4 shows a sheet before cutting, and first and second printing sheets after cutting.

FIG. 4 shows the printing sheet P before cutting and the first printing sheet P1 and the second printing sheet P2 after cutting. FIG. 4 shows an example of cutting the printing sheet P that is not being conveyed in the second conveying direction D2 into the first printing sheet P1 and the second printing sheet P2. An arrow in FIG. 4 indicates the first conveying direction D1. As shown in FIG. 4, the printing sheet P is cut by the cutting mechanism 10 to be separated into two parts, that is, the first printing sheet P1 corresponding to a first half in the first conveying direction D1 and the second printing sheet P2 corresponding to a second half in the first conveying direction D1. In the following description, the process of cutting the printing sheet P into the first and second printing sheets P1 and P2 may be referred to as a cutting process CU.

A printing sheet AP, a first printing sheet AP1, and a second printing sheet AP2 shown on the front side with respect to the plane of FIG. 4 are front surfaces of the printing sheet P, first printing sheet P1, and the second printing sheet P2, respectively. A printing sheet PP, a first printing sheet PP1, and a second printing sheet PP2 shown on a farther side with respect to the printing sheets AP, AP1, AP2 in FIG. 4 show back surfaces of the printing sheet P, the first printing sheet P1, and the second printing sheet P2. It is noted that the front surface in this specification refers to a surface, on which a page image is printed by the print engine 3, of the printing sheet P conveyed from the sheet feed tray 21. In other words, the front surface is a surface on which printing can be performed by the print engine 3 without performing the switchback process SB. Further, in this specification, the back surface is a surface opposite to the front surface. That is, the back surface is the surface on which an image can be printed by the print engine 3 by performing the switchback process SB.

According to the above configuration, it is possible to print page images on the printing sheet P for two pages on the front surface and two pages on the back surface. In other words, it is possible to print four pages (2n) of page images on a single printing sheet P. The printing sheet P has print areas F1-F4 on each of which page image for one page can be printed. Each print area F1-F4 corresponds to A5 size. Each of the print areas F1-F4 is defined as follows.

As shown in FIG. 4, the first print area F1 and the second print area F2 are areas on the front surface of the printing sheet P. The first print area F1 is the area corresponding to the first half, in the first conveying direction D1, on the printing sheet P that has not undergone the switchback process SB. The second print area F2 is an area corresponding to the second half, in the first conveying direction D1, on the printing sheet P that has not undergone the switchback process SB.

The third print area F3 and the fourth print area F4 are areas on the back surface of the printing sheet P. The third print area F3 is the area corresponding to the second half, in the first conveying direction D1, on the printing sheet P that has not undergone the switchback process SB. The third print area F3 is the area directly behind the second print area F2. The fourth print area F4 is the area corresponding to the first half, in the first conveying direction D1, on the printing sheet P that has not undergone the switchback process SB. The fourth print area F4 is the area directly behind the first print area F1.

Image Printing Process

Next, the printing method in the image printing process implemented by printing apparatus 1 will be explained. The print engine 3 prints a page image on the printing sheet P based on the print data. The print data contains multiple page images, each of which represents page data for one page. The multiple page images in the print data are arranged in a sequence corresponding to the order of the page numbers. In this specification, the page number indicates the order of the page images contained in the print data. It is noted that the page number does not indicate a number printed on the printing sheet P.

The printing apparatus 1 causes the print engine 3 to print the page images on the front and back surfaces of the printing sheet P based on the received printing data such that the page images printed on the front and back surfaces of the first printing sheet P1 and the second printing sheet P2 discharged to the discharge tray 22 are in the order of the page numbers specified by the print data, and the page numbers of the page images are sequentially smaller according to the order in which they are discharged to the discharge tray 22. This printing method is hereinafter referred to as duplex reverse order printing. In this duplex reverse order printing, the page image printed on each print area F1-F4 of the printing sheet P are determined so that the first page of print data is printed on the reverse side of the second printing sheet P2, which is discharged last. According to such duplex reverse order printing, the image of the first page of print data can be printed on the topmost second printing sheet P2 of the printing sheets stacked in the discharge tray 22. Further, according to this duplex reverse order printing, the page images printed on the front and back surfaces of the first and second printing sheets P1 and P2 that are discharged to the discharge tray 22 are printed in page number order from the top to the bottom. Therefore, the user does not need to sort the printing sheets P discharged in the discharge tray 22 in order of the page number.

The printing method of duplex reverse order printing according to the present disclosures will be described in detail with reference to FIG. 5 through FIG. 8. Regarding FIG. 5 through FIG. 8, for convenience of explanation, the cutting process CU is described as being performed after completion of the image printing process that prints the page image on the front or back surface of the printing sheet P. It is noted, however, that in relation between the cutting process CU and the image printing process, the order of execution is not limited to the order shown in FIG. 5 through FIG. 8.

In FIG. 5 through FIG. 8, a first page image of the print data is represented by a page image G1, a second page image by a page image G2, a third page image by a page image G3, a fourth page image by a page image G4, and a fifth page image by a page image G5, and the following explanations are provided.

Figure 5:
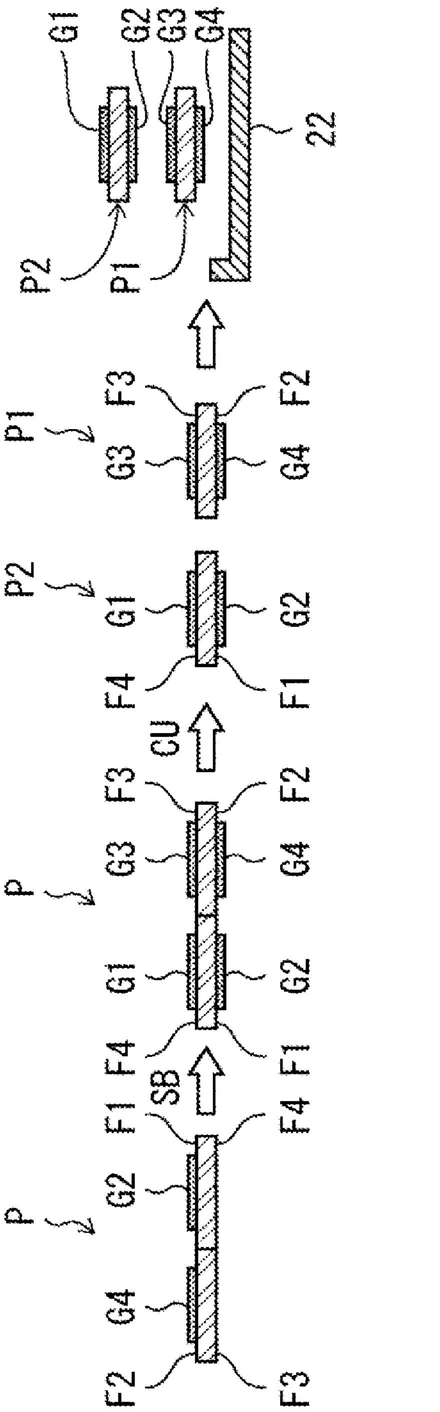
FIG. 5 illustrates a printing method when four pages of page images are contained in print data.

FIG. 5 schematically illustrates the printing method when the print data contains four pages of page images. The print data contains page images G1-G4 that correspond to pages 1-4.

First, the print engine 3 prints the page image G2 and the page image G4 on the front surface of the printing sheet P conveyed from the sheet feed tray 21. The print engine 3 prints the page image G2 in the first print area F1. That is, page image G2 is printed first on the printing sheet P. Thereafter, the print engine 3 prints the page image G4 in the second print area F2. On the surface of the printing sheet P, the page image G4, which is the page image corresponding to the last page number of the print data (hereinafter referred to as the final page image), is printed.

After the page images are printed on the front surface of the printing sheet P, the switchback process SB is performed. After the switchback process SB, the print engine 3 prints the page image G1 and the page image G3 on the back surface of the printing sheet P. The print engine 3 prints the page image G3 in the third print area F3. Thereafter, the print engine 3 prints the page image G1 in the fourth print area F4. That is, page image G1 is printed last on the printing sheet P.

After the page image G1 is printed on the back surface of the printing sheet P, the cutting process CU is performed. The first printing sheet P1 is discharged to the discharge tray 22 before the second printing sheet P2. That is, the first printing sheet P1 is discharged first. The second printing sheet P2 is discharged to the discharge tray 22 subsequent to the first printing sheet P1. That is, the second printing sheet P2 is ejected second (n-th). The page images G1 to G4 printed on the front and back surfaces of the first printing sheet P1 and the second printing sheet P2 are printed in page number order, with the page numbers decreasing in sequence as they are discharged to the discharge tray 22. In other words, the page images printed on both surfaces of the first printing sheet P1 and second printing sheet P2 stacked in the discharge tray 22 are in order of page number from the top.

The example shown in FIG. 5 corresponds, in other words, to a case where four pages of page images are printed on a single printing sheet P. That is, when the number of pages of page images included in the print data is 5 pages (2n+1) or more, the page images are printed on the second and subsequent printing sheets P conveyed from the sheet feed tray 21 after the print job is received, using the printing method shown in FIG. 5. In such a case, the first page image is the page image with the lowest page number printed on the printing sheet P, while the page images on pages 2 through 4 are the page images with the page numbers following the lowest page number.

According to the above configuration, the printing sheet P is not cut off during printing on the front surface. Therefore, when printing on the back surface of the printing sheet P, the first printing sheet P1 and the second printing sheet P2 are not conveyed with an interval between them. As a result, the printing time required to print on both surfaces can be shortened.

Figure 6A:
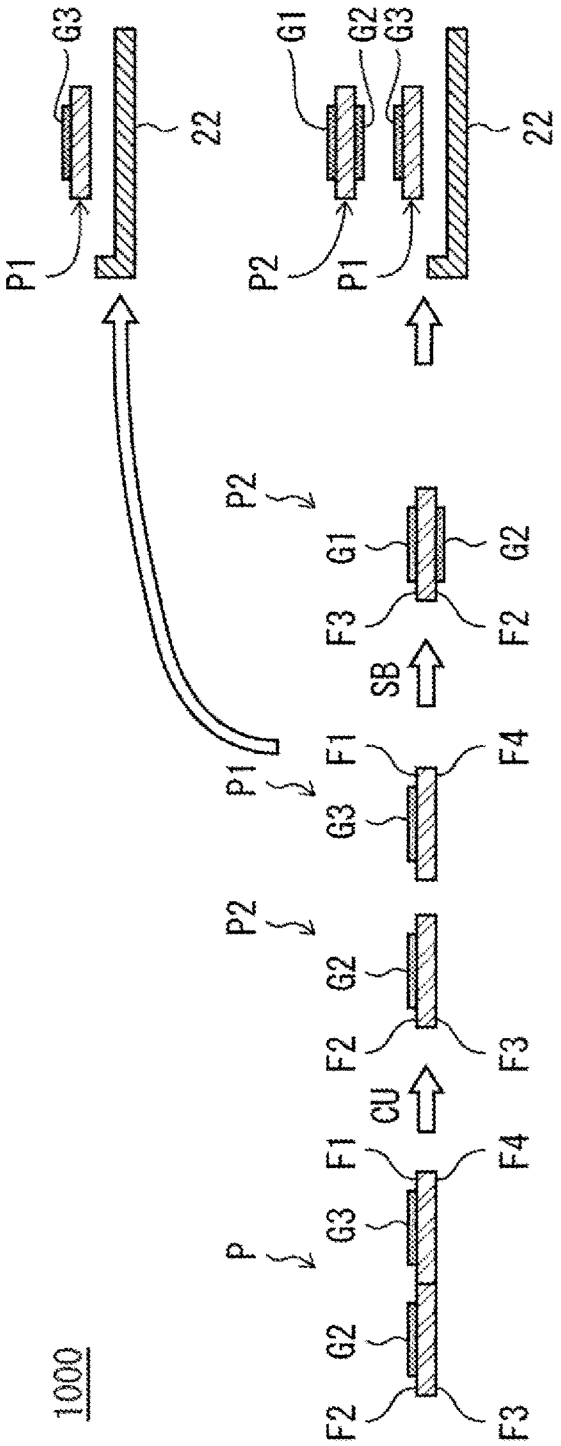
FIGS. 6A and 6B illustrate a printing method when three pages of page images are contained in print data.
Figure 6B:
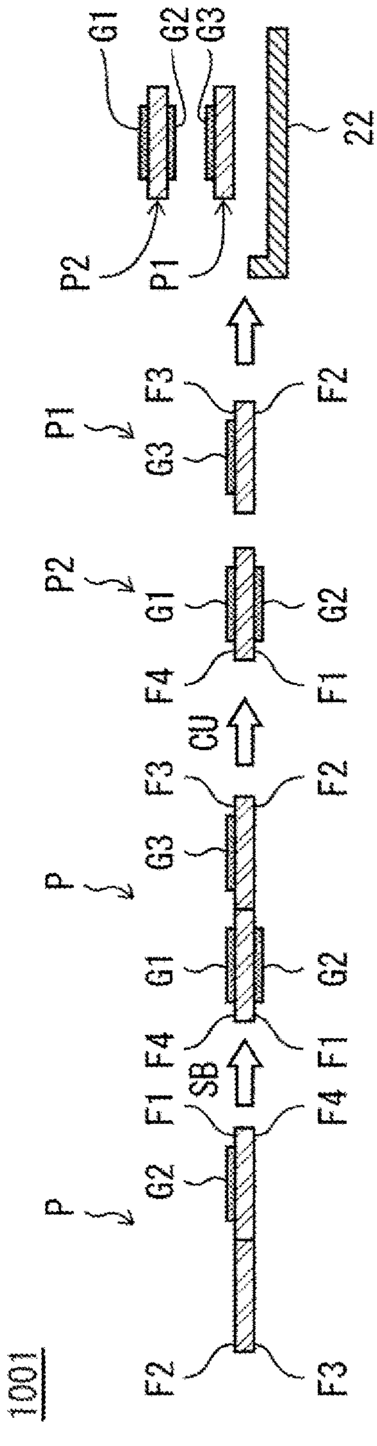

FIG. 6A and FIG. 6B schematically illustrate a case where three pages of page images are included in the print data is described. FIG. 6A schematically illustrates the printing method. In this example, the print data contains page images G1-G3 corresponding to pages 1-3.

As shown in FIG. 6A, the print engine 3 first prints the page image G2 and the page image G3 on the front surface of the printing sheet P conveyed from the sheet feed tray 21. The print engine 3 prints the page image G3 in the first print area F1. That is, the page image G3 is printed first on the printing sheet P. Then, the print engine 3 prints the page image G2 in the second print area F2. On the front surface of the printing sheet P, the page image G3 corresponding to the last page number of the print data is printed.

After the page image is printed on the front surface of the printing sheet P, the cutting process CU is performed. The first printing sheet P1 is discharged to the discharge tray 22 before the second printing sheet P2. That is, the first printing sheet P1 is discharged first. After the first printing sheet P1 is discharged, the switchback process SB is performed. After the switchback process SB, the print engine 3 prints the page image G1 on the back surface of the second printing sheet P. The print engine 3 prints the page image G1 in the third print area F3. That is, page image G1 is printed last on the printing sheet P (i.e., the second printing sheet P2). After the page image G1 is printed on the second printing sheet P2, the second printing sheet P2 is discharged to the discharge tray 22. That is, the second printing sheet P2 is discharged second (n-th).

The page images G1 to G3 printed on the front and back surfaces of the first printing sheet P1 and the second printing sheet P2 are printed in page number order, with the page numbers decreasing sequentially as they are discharged to the discharge tray 22. In other words, the page images printed on both surfaces of the first printing sheet P1 and second printing sheet P2 stacked in the discharge tray 22 are in order of page number from the top.

The example shown in FIG. 6A is the printing method when the number of page images to be printed for a printing sheet P is three. In other words, the printing method shown in FIG. 6A corresponds to the printing method for performing the printing on the printing sheet P in which the page image corresponding to the last page number is printed when the printing sheet P is divided into two parts (n=2) and the remainder when the number of pages of page images in the print data is divided by four (4) is three (3) (i.e., when the number of pages is not divisible by 4 and the remainder is 3). That is, the above printing method is for printing on the first printing sheet P conveyed from the sheet feed tray 21 after receiving a print job.

Figures 7A, 7B:
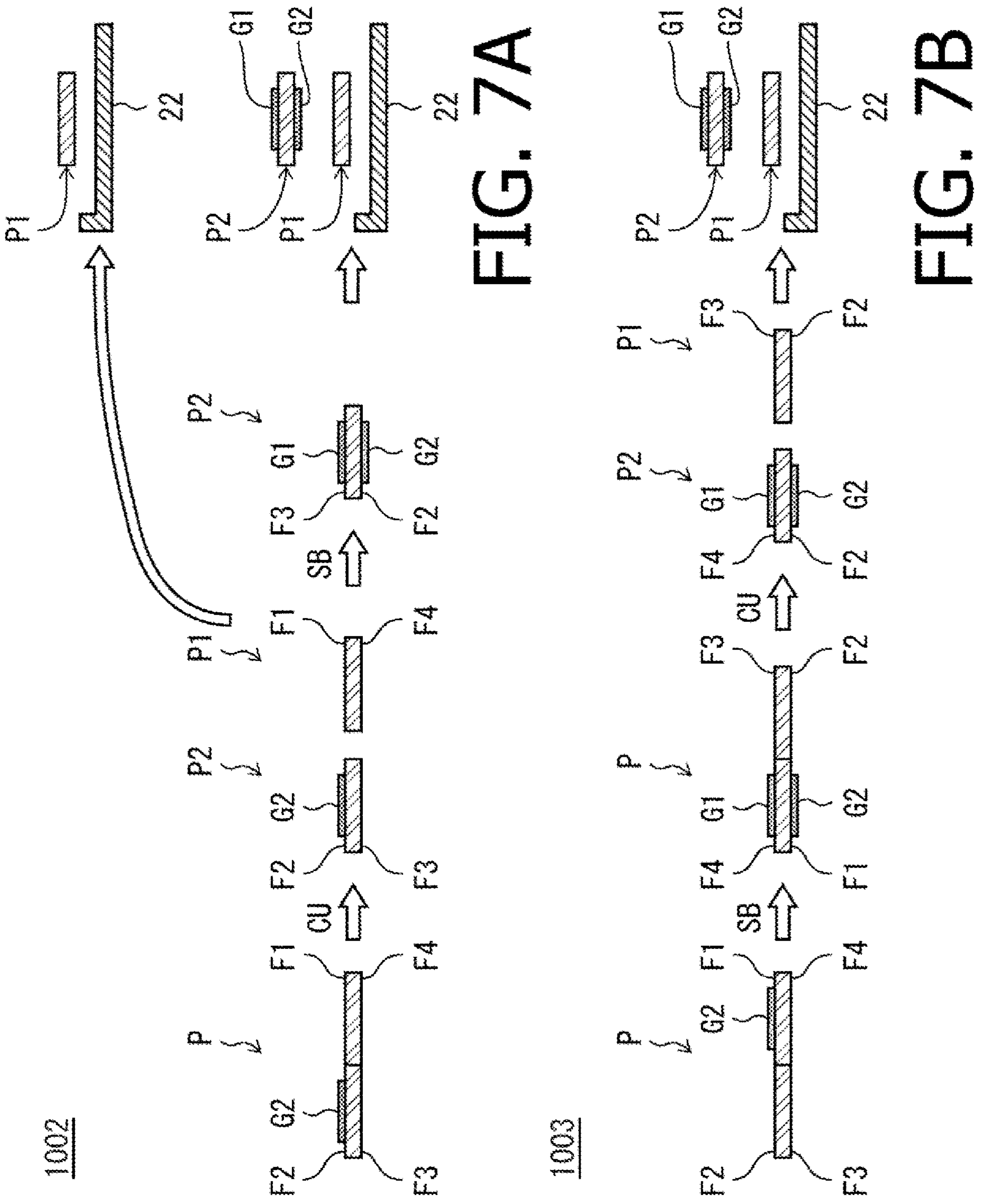
FIGS. 7A and 7B illustrate a printing method when two pages of page images are contained in print data.

With reference to FIGS. 7A and 7B, a case where two pages of page images are contained in the print data is described. FIG. 7A schematically illustrates the printing method. In this example, the print data contains the first page image G1 and the second page image G2.

As shown in FIG. 7A, the print engine 3 prints the page image G2 on the front surface of the printing sheet P that is conveyed from the sheet feed tray 21. The print engine 3 prints the page image G2 in the second print area F2. That is, on the printing sheet P, the page image G2 is printed first. On the front surface of the printing sheet P, the page image G2 corresponding to the last page number of the print data is printed.

After the page image G2 is printed on the front surface of the printing sheet P, the cutting process CU is performed. The first printing sheet P1 is discharged to the discharge tray 22 before the second printing sheet is discharged. That is, the first printing sheet P1, which has no page image printed on its front surface, is discharged first. The page image is not printed on the front and back surfaces of the first printing sheet P1. After the first printing sheet P1 is discharged, the switchback process SB is performed for the second printing sheet P2. Thereafter, the print engine 3 prints the page image G1 on the back surface of the second printing sheet P2. The print engine 3 prints the page image G1 in the third print area F3. That is, the page image G1 is printed last on the printing sheet P (in this case, the second printing sheet P2).

After the page image G1 is printed on the back surface of the second printing sheet P2, the second printing sheet P2 is discharged to the discharge tray 22. The second printing sheet P2 is discharged second (n-th). The page images G1 and G2, which are printed on the front and back surfaces of the second printing sheet P2 discharged to the discharge tray 22, are printed in page number order, with the page numbers decreasing sequentially as the sheet is discharged to the discharge tray 22.

The example shown in FIG. 7A is a printing method when the number of page images to be printed on the printing sheet P is 2. In other words, the printing method shown in FIG. 7A corresponds to the printing method for performing the printing on the printing sheet P in which the page image corresponding to the last page number is printed when the printing sheet P is divided into two parts (n=2) and the remainder when the number of pages of page images in the print data is divided by four (4) is two (2) (i.e., when the number of pages is not divisible by 4 and the remainder is 2). That is, the printing method described above is a printing method for the printing sheet P that is conveyed first from the sheet feed tray 21 after receiving a print job.

Figures 8A, 8B:
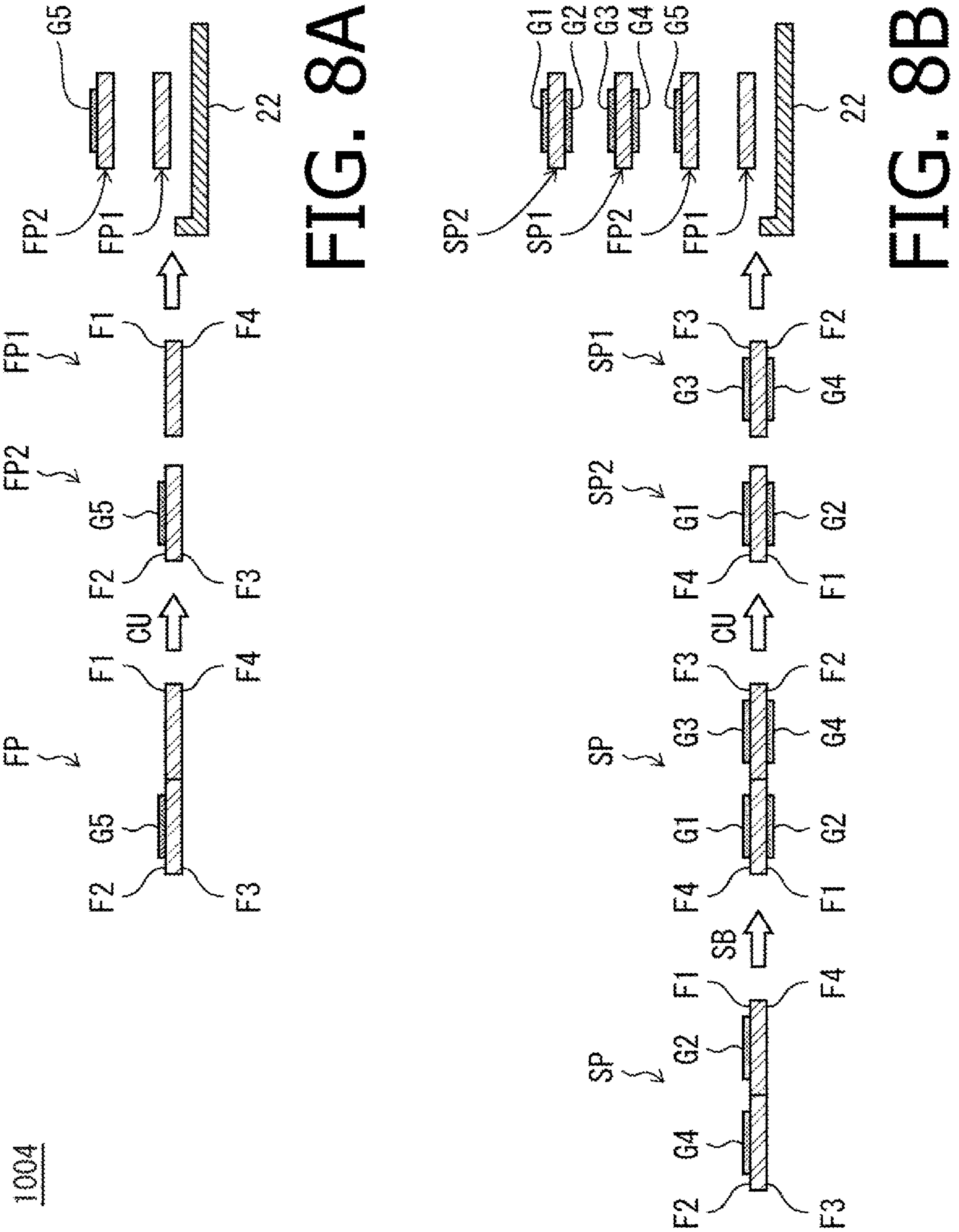
FIGS. 8A-8D illustrate a printing method when five pages of page images are contained in print data.
Figure 8C:
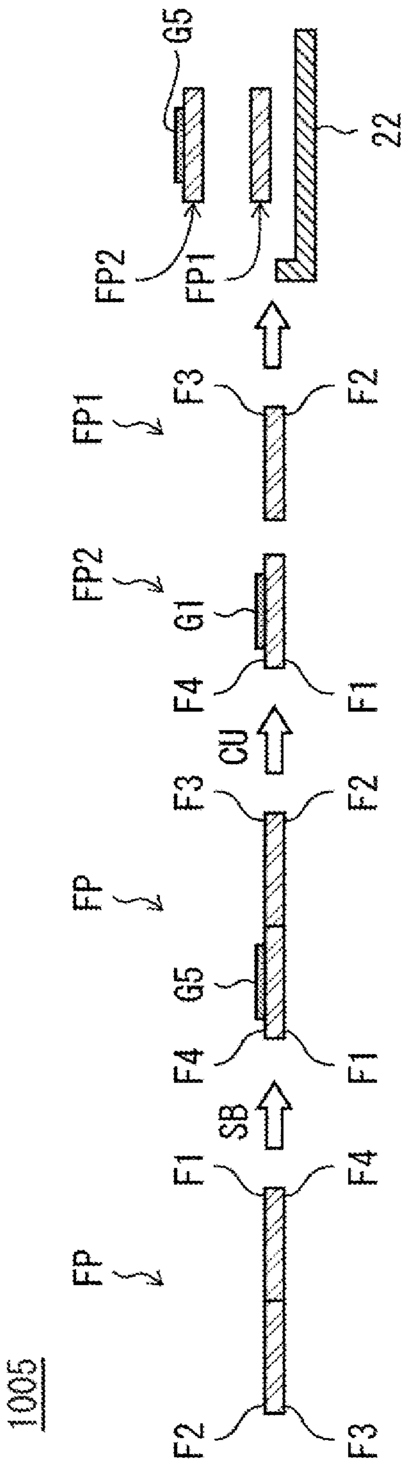
Figure 8D:
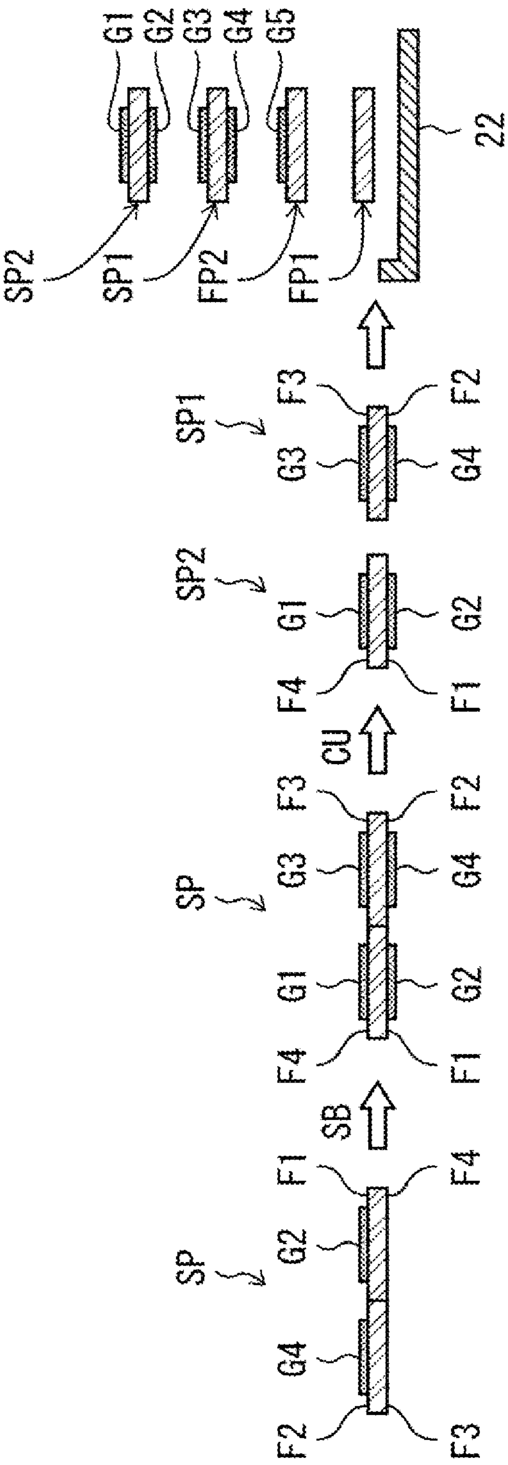

Next, with reference to FIGS. 8A-8D, a case where five pages of page images are included in the print data will be described. FIG. 8 schematically illustrates the printing method when the print data contains five pages of page images. FIG. 8A schematically illustrates the printing method according to the present embodiment. The print data contains page images G1-G5 corresponding to pages 1-5.

As shown in FIGS. 8A and 8B, the print engine 3 prints the page image G5 on the front surface of the printing sheet P (hereinafter referred to as a printing sheet FP in FIGS. 8A-8D) that is conveyed first from the sheet feed tray 21 after the print job is received. The print engine 3 prints the page image G5 in the second print area F2 of the printing sheet FP. On the surface of the printing sheet FP, the page image G5 corresponding to the last page number of the print data is printed.

After the page image G5 is printed on the surface of the printing sheet FP, the cutting process CU is performed. A first printing sheet FP1 is discharged to the discharge tray 22 before a second printing sheet FP2 is discharged. That is, the first printing sheet FP1, which has no page image printed on its front surface, is discharged first. After the first printing sheet FP1 is discharged, the second printing sheet FP2 is subsequently discharged. That is, the second printing sheet FP2 is discharged second (n-th). The first printing sheet FP1 and the second printing sheet FP2 are discharged without being subjected to the switchback process SB.

After the second printing sheet FP2 is discharged, the printing sheet P is conveyed from the sheet feed tray 21. In FIGS. 8A-8D, the printing sheet P that is conveyed following the printing sheet FP is hereinafter referred to as a printing sheet SP. On the printing sheet SP, the remaining page images of the print data, i.e., page images G1 to G4, are printed. Since the method of printing page images on the printing sheet SP is the same as the method shown in FIGS. 5A, the description thereof is omitted.

The page images G5 printed on the front surface of the second printing sheet FP2, and the page images to be printed on the front and back surfaces of the first and second printing sheets SP1 and SP2 are printed in page number order, with the page numbers decreasing sequentially as the sheets are discharged to the discharge tray 22. In other words, the page images printed on both surfaces of the first printing sheet P1 and second printing sheet P2 stacked in the discharge tray 22 are in order of page number from the top.

The duplex reverse order printing described above can be achieved by printing the page images contained in the print data in a particular order. The order of the page images to be printed depends on the number of page images to be printed. Further, the order of the page images to be printed varies depending on the format of the print data received by the printing apparatus 1. In such a case, it is necessary to rearrange the order of the page images to be printed in an internal process of the printing apparatus 1.

Referring to FIGS. 9A-9C, a process performed by the controller 100 to achieve the duplex reverse order printing is described. FIGS. 9A-9C show the contents of the print data and the order of the page images to be printed on the printing sheet P. In FIGS. 9A-9C, it is assumed that the print data contains five pages of page images. Further, in the present embodiment (when n=2), the duplex reverse order printing can be achieved by printing page images in the order of page 5, page 2, page 4, page 3, and page 1 (see FIG. 8). Hereafter, the order in which the page images contained in the print data are printed on the conveyed printing sheet P is referred to as the printing order.

FIG. 9A shows print data containing page images arranged in page number order. The print data DA1 shown on the left-hand side of FIG. 9A is an example of the print data included in a print job received by the printing apparatus 1. As shown in FIG. 9A, the print data DA1 includes image data A to E. Image data A represents the page image of the first page, image data B represents the page image of the second page, image data C represents the page image of the third page, image data D represents the page image of the fourth page, and image data E represents the page image of the fifth page. That is, the image data A to E in the print data DA1 are arranged in order of the page number.

The controller 100 is configured to analyze the contents of the print data DA1. The controller 100 obtains from analysis results the number of pages of the page images included in the print data DA1 and the page numbers of the page images included in the print data DA1. Based on the obtained number of pages, the controller 100 determines whether the order of image data A to E in the print data DA1 is suitable for the duplex reverse order printing. Since the order of the image data A to E in the print data DA1 is not suitable for the duplex reverse order printing, the controller 100 rearranges the image data A to E in the print data DA1 into the printing order suitable for the duplex reverse order printing.

As shown on the right-hand side of FIG. 9A, the controller 100 sets the order of the image data A to E of the print data DA1 to the print order PO1 suitable for duplex reverse order printing. That is, the controller 100 rearranges the printing order in the order of Image Data E, Image Data B, Image Data D, Image Data C, and Image Data A. In this way, the duplex reverse order printing can be achieved.

FIG. 9B shows print data containing page images arranged in an order suitable for the duplex reverse order printing. The print data DA2 shown on the left-hand side of FIG. 9B is an example of the print data included in a print job received by the printing apparatus 1. The print data DA2 includes image data A-E. Image data A represents the page image of page 5, image data B represents the page image of page 2, image data C represents the page image of page 4, image data D represents the page image of page 3, and image data E represents the page image of page 1. That is, Image data A to E in print data DA2 are arranged in an order suitable for the duplex reverse order printing.

The controller 100 analyzes the contents of the print data DA2 and obtains the number of pages of the page images contained in the print data DA2 and the page numbers of the page images contained in the print data DA1. Since the order of the image data A to E in the print data DA2 is the printing order suitable for the duplex reverse order printing, the controller 100 sets the order of the image data A to E in the print data DA2 as the printing order PO2. That is, the controller 100 does not perform the process of rearranging the printing order.

FIG. 9C shows print data when multiple page images are included in one image data. The print data DA3 shown on the left hand side of FIG. 9C is an example of print data included in a print job received by the printing apparatus 1. In the present embodiment, the image data A to C included in the print data DA3 are image data corresponding to A4 size printing sheet. The image data A contains page images of the first page and the second page. The image data B contains page images of the third page and the fourth page. The image data C contains a page image of the fifth page and a blank image. The page images of pages 1 to 5 included in image data A to C are image data corresponding to A5 size paper. The blank image means that the print data includes a portion that does not contain an image to be printed.

Since each of the image data A to C contains multiple page images, the controller 100 performs a process of splitting the page images contained in each of the image data A to C. The controller 100 divides the image data A into image data A1 (a page image of a first page) and image data A2 (a page image of a second page). Similarly for image data B and image data C, controller 100 divides image data B into image data B1 (a page image of a third page) and image data B2 (a page image of a fourth page), and divides image data C into image data C1 (a page image of a fifth page) and image data C2 (a blank image).

The controller 100 analyzes the contents of the print data DA3 and obtains the number of pages of the page images contained in the print data DA3 and the page numbers of the page images contained in the print data DA1. The page images contained in the image data A to C of the print data DA3 are arranged in order of page number. Therefore, it is necessary for the controller 100 to rearrange the page images contained in image data A to C of the print data DA1 into a printing order suitable for the duplex reverse order printing.

The controller 100 divides the image data A to C of the print data DA3 as described above and sets a print order of the divided image data to the print order PO3 suitable for the duplex reverse order printing. That is, the controller 100 sets the print order in the order of the image data C1, the image data A2, the image data B2, the image data B1, and the image data A1. In this way, the duplex reverse order printing can be achieved.

The controller 100 may be configured to analyze whether the last page image in the print data is a blank page image. Page images in the print data may contain blank page images that do not contain images to be printed. When the controller 100 analyzes that the last page image of the print data is a blank page image, the controller sets the print order excluding the blank page image. That is, the controller 100 performs the printing excluding the blank page images. A page that is one page before the blank page image is regarded as the last page of the print data.

As an example, it is assumed that print data DA4 (not shown) contains six pages of page images. It is further assumed that page images contained in the print data DA4 include images to be printed on pages 1 through 5, while page 6 does not include any images to be printed. In such a case, the controller 100 analyzes the print data DA4 and rearranges the print order, excluding the page image of the sixth page, which is the last page. That is, it is regarded that the last page of the print data DA4 is the fifth page. Therefore, the page images in the print data DA4 are printed in the order of page 5, page 2, page 4, page 3, and page 1.

According to the above configuration, in the image printing process, page images are printed on the printing sheet P excluding blank pages contained in the print data. Therefore, time can be reduced by the amount of time required to convey blank pages. As a result, printing time can be reduced when the duplex printing is performed. The printing apparatus 1 may be configured to obtain the number of pages of page images contained in the print data prior to receiving the print data as described above.

Reduction of Printing Time

As described above, in the duplex reverse order printing, when the number of pages contained in the print data is not a multiple of 4 (i.e., 2n), that is, when the number of pages is not divisible by 4, the printing sheet P, on which the final page image of the print data is printed, has blank areas where no page image is printed. Conveying the printing sheet P for such blank portions is a waste of time and unnecessarily increases printing time. As will be shown below, by conveying the printing sheet P unnecessarily, the number of switchback processes in the printing time may be increased. As a result, there are concerns about deterioration of the conveying motor 108 and increased paper waste. In this respect, there was room for improvement in the duplex reverse order printing.

The reduction in printing time made possible by the printing method of the present disclosure is explained in comparison with the examples shown in FIG. 6A to FIG. 8D. FIG. 6B shows an example to be compared with the configuration shown in FIG. 6A. FIG. 7B shows an example to be compared with the configuration shown in FIG. 7B. FIGS. 8C and 8D show an example to be compared with the configuration shown in FIGS. 8A and 8B.

In the examples mentioned above (i.e., the examples shown in FIGS. 6B, 7B, 8C and 8D, the page images to be printed in the print areas F1-F4 are fixed. In more detail, in the print area F1, the page image with the second lowest page number among the page images to be printed on the printing sheet P is printed. In the print area F2, the page image with the fourth lowest page number among the page images to be printed on the printing sheet P is printed. In the print area F3, the page image with the third smallest page number among the page images printed on the printing sheet P is printed. The page image with the lowest page number among the page images printed on the printing sheet P is printed in the F4 print area.

In the examples mentioned above, the page image G2 is printed on the print area F1 of the printing sheet P. The page image G4 is printed on the print area F2 of the printing sheet P. The page image G3 is printed on the print area F3 of the printing sheet P. The page image G1 is printed on the print area F4 of the printing sheet P.

Referring to FIG. 6B, a case where the print data contains three pages of page images is described. In this example, the switchback process SB is executed after printing the page image G2 on the print area F1 which is on the front surface of the printing sheet P. After the switchback process SB, the page images G3 and G1 are printed on the print areas F3 and F4 on the back surface of the printing sheet P, respectively. Thereafter, the cutting process CU is executed, and the first printing sheet P1 and the second printing sheet P2 are discharged to the discharge tray 22.

As described above, the page image to be printed is determined for each of the print areas F1-F4. In the example shown in FIG. 6B, the cutting process CU can only be executed after the switchback process SB has been executed. Therefore, the conveyance of the print area F2, on which no page image is printed, is a wasteful conveyance and is cause of a longer printing time.

In contrast, according to the printing method shown in FIG. 6A, the cutting process CU is executed before the switchback process SB is executed. According to the above configuration, only the second printing sheet P2, which is discharged secondly, can be subjected to the second conveying process. Therefore, it is not necessary to perform the second conveying process for the first printing sheet P1, which is conveyed before the second printing sheet P2 which is discharged secondly. That is, the amount of conveyance of the printing sheet P is reduced by the amount of print area F4 (corresponding to the print area F2 in the example shown in FIG. 6B). Thus, it is possible to shorten the time for the duplex reverse order printing.

The examples shown in FIG. 7B and FIGS. 8C-8D are similar to FIG. 6B. In the example shown in FIG. 7B, the cutting process CU is executed after the switchback process SB is executed. In contrast, according to the printing method shown in FIG. 7A, the cutting process CU is executed before the switchback process SB is executed. Further, for the printing sheet P, the page image G2 is printed on a portion corresponding to the second printing sheet P2 of the front surface of the printing sheet P2. According to the above configuration, the page image G2 is printed on the print area on the front surface of the second printing sheet P2, which is the printing sheet to be discharged second. Therefore, it is not necessary to perform the second conveying process for the first printing sheet P1 that is conveyed before the second printing sheet P2 that is discharged second. In other words, the conveying amount of the printing sheet P is reduced by the amount of the print area F4 (corresponding to the print area F2 in FIG. 7B). Thus, it is possible to shorten the time for the duplex reverse order printing.

In FIGS. 8C and 8D, the method of printing the page images G1-G4 on the printing sheet SP is substantially the same as the method of printing according to the present embodiment shown in FIGS. 8A and 8B except for the method of printing the page image G5 on the printing sheet FP. In FIGS. 8A and 8B, the page image G5 is a page image with the lowest page number among the page images to be printed on the printing sheet P. Therefore, the page image G5 is printed in the print area F4.

As shown in FIGS. 8C and 8D, the cutting process CU is executed after the switchback process SB is executed for the printing sheet FP. In contrast, in the printing method according to the present embodiment shown in FIGS. 8A and 8B, the cutting process CU is performed after printing the page image G5 on the print area F2 of the printing sheet FP. Further, in the printing method according to the present embodiment, the page image G5 is printed on a portion of the printing sheet P corresponding to the second printing sheet P2. According to the above configuration, the first printing sheet P1 and the second printing sheet P2, which are divided into two equal parts, can be discharged to the discharge tray 22 without performing the second conveyance process. Therefore, the conveying amount can be reduced by the conveying amount of the second conveying process. That is, the conveying amount of printing sheet P is reduced by the amount corresponding to the print area F3 and the print area F4 (corresponding to the print area F1 and the print area F2 in FIGS. 8C and 8D). Thus, it is possible to shorten the time for the duplex reverse order printing.

According to the configuration of the present embodiment, the last page is printed on the front surface of the printing sheet P. That is, the printing sheet P on which the last page image is printed can be cut at the time of the front surface printing. Therefore, the first or second printing sheet P1 or the second printing sheet P2, on which the first page is printed, can be discharged without performing the second conveying process. Thus, it is possible to shorten the time for the duplex reverse order printing.

Further, according to the configuration of the present embodiment, when two or three page images are printed on the printing sheet P, the second conveying process is performed only for the second printing sheet P2, which is the printing sheet to be discharged second, and requires a page image to be printed on the back surface. Therefore, the first printing sheet P1, which does not require a page image to be printed on the back surface, can be discharged to the discharge tray 22 without performing the second conveying process. Thus, it is possible to shorten the time for the duplex reverse order printing.

According to the configuration of the present embodiment, the first printing sheet P1, which does not have a page image printed on its front surface, is discharged to the discharge tray 22 without being subjected to the second conveyance process. Therefore, the conveying amount of the first printing sheet P1 can be reduced by the conveying amount by the second conveying process. Thus, it is possible to shorten the time for the duplex reverse order printing.

Figure 10:
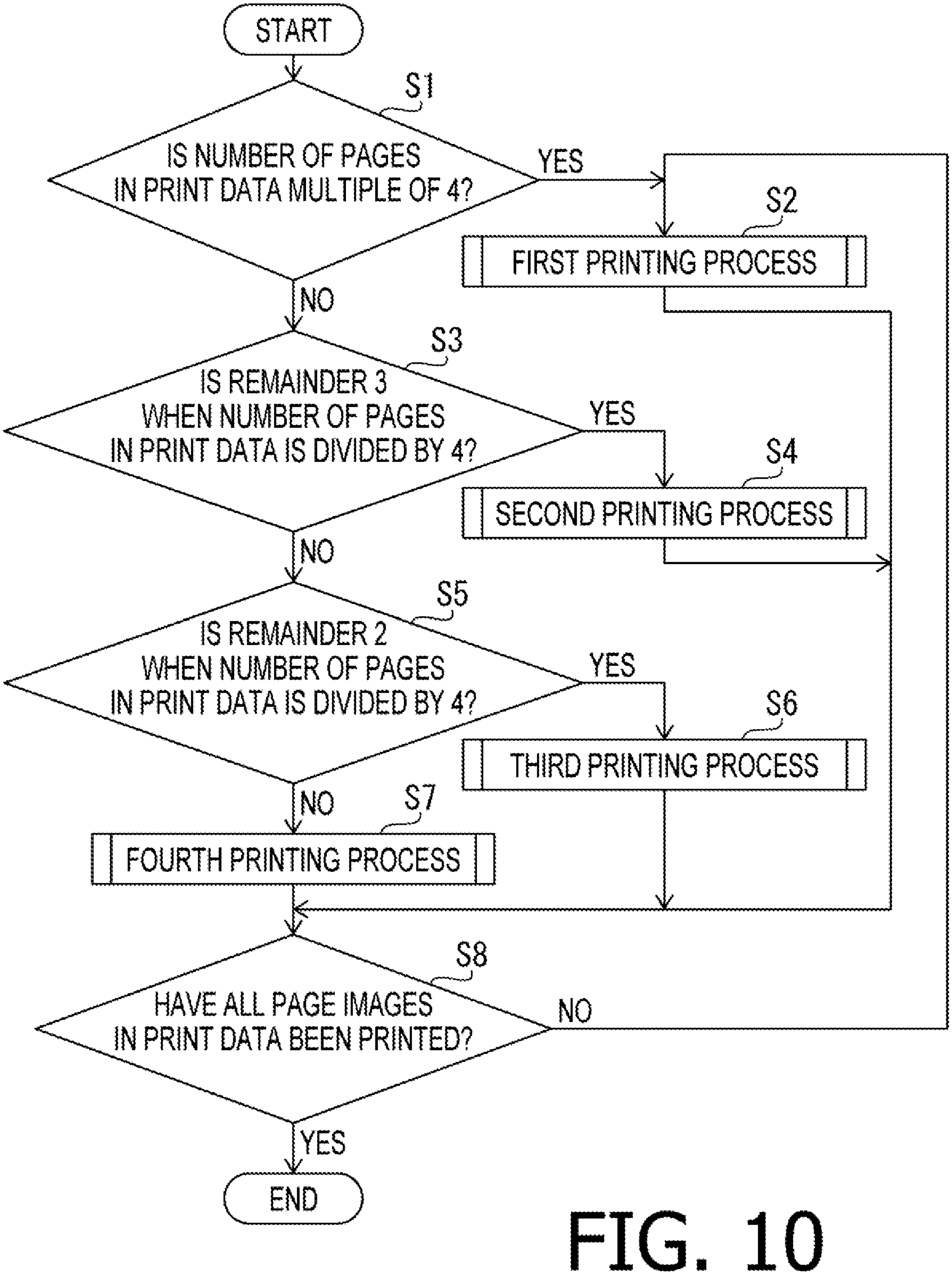
FIG. 10 is a flowchart illustrating a control flow performed by a controller of the printing apparatus.
Figure 11:
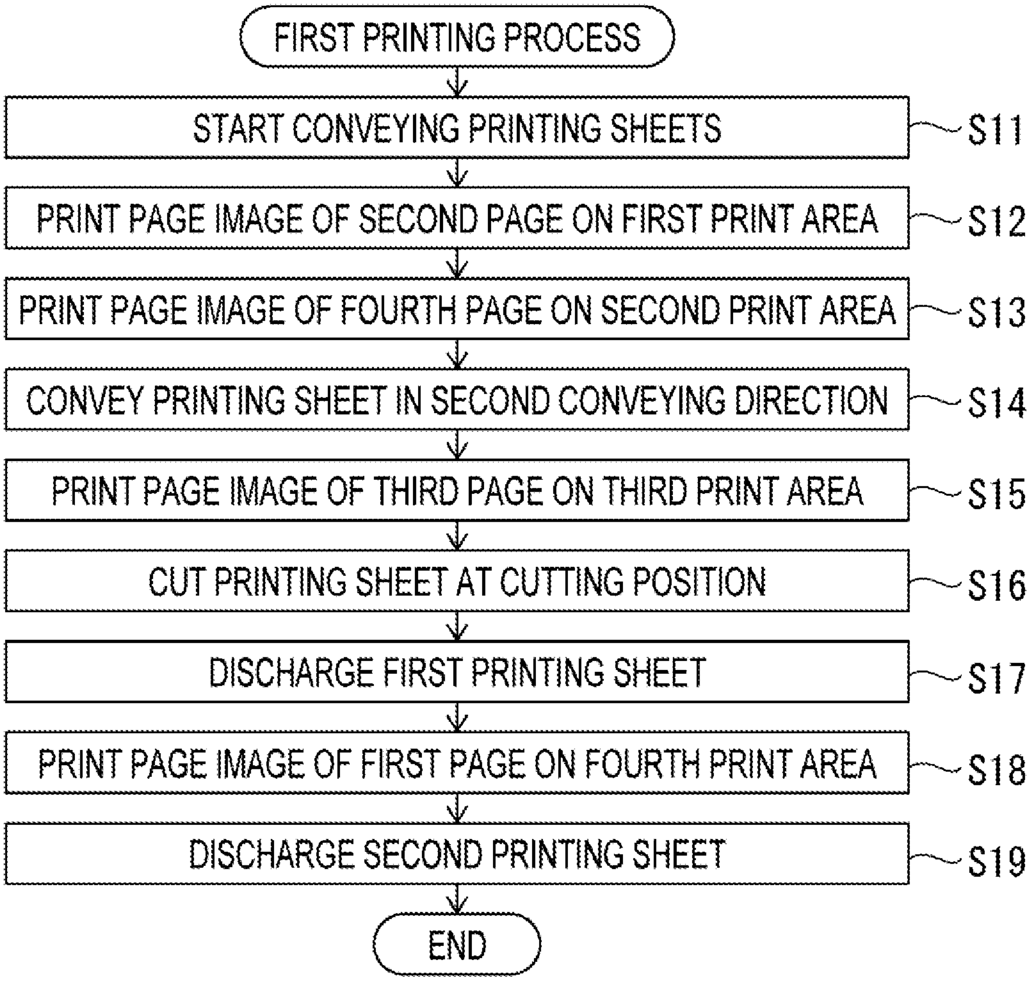
FIG. 11 is a flowchart illustrating a first printing process.
Figure 12:
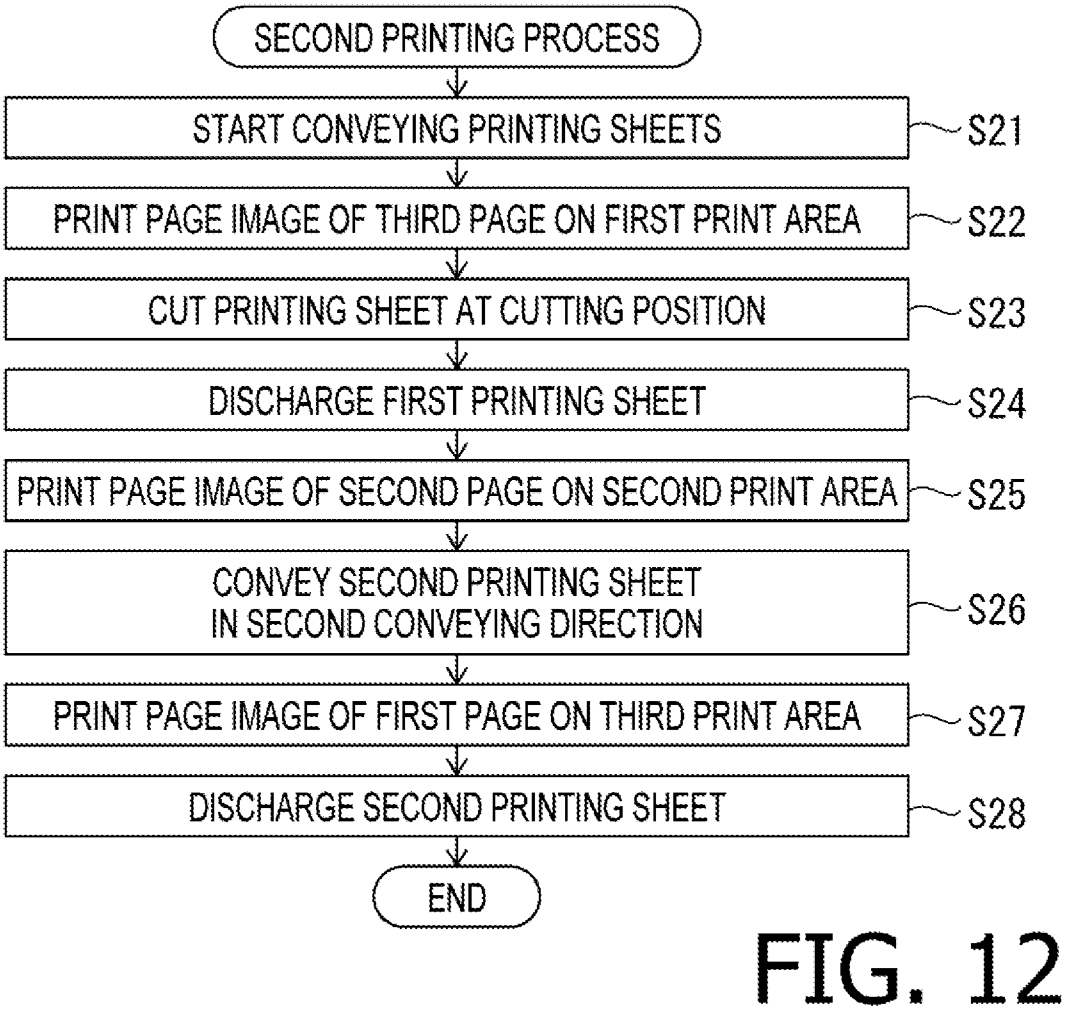
FIG. 12 is a flowchart illustrating a second printing process.
Figure 13:
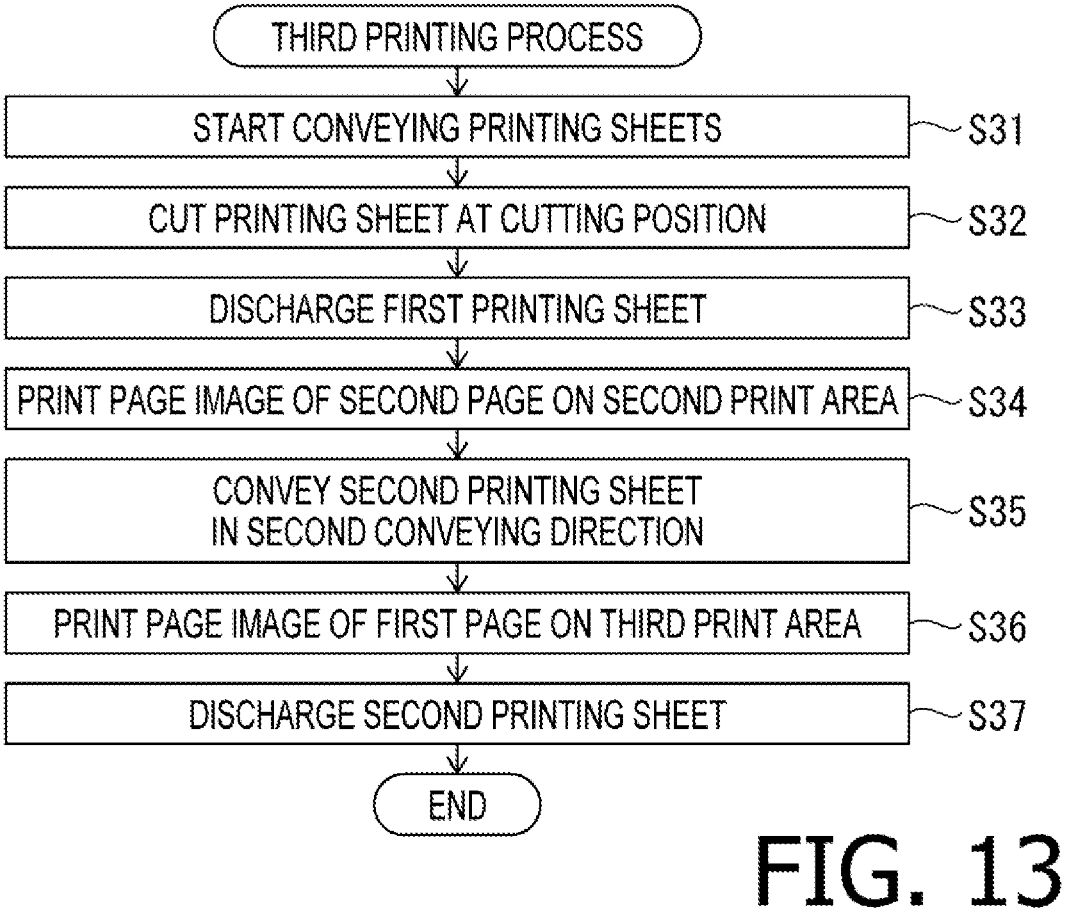
FIG. 13 is a flowchart illustrating a third printing process.
Figure 14:
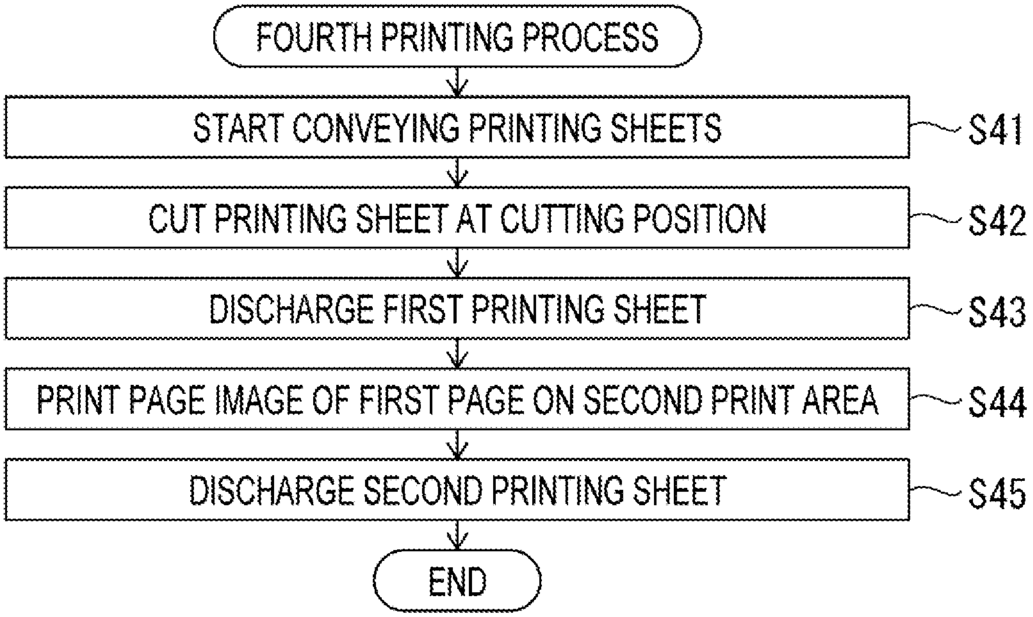
FIG. 14 is a flowchart illustrating a fourth printing process.

A control flow by the controller 100 of the printing apparatus 1 is described with reference to flowcharts shown in FIG. 10 to FIG. 14. FIG. 10 shows a flowchart showing the control flow by the controller 100 of the printing apparatus 1. FIG. 11 shows a flowchart of the first printing process called in S2 of FIG. 10. FIG. 12 shows a flowchart of the second printing process called in S4 FIG. 10. FIG. 13 shows a flowchart of the third printing process called in S6 of FIG. 10. FIG. 14 shows the flowchart of the fourth printing process called in S7 of FIG. 10.

In the following description of the flowcharts, for a page image printed on a printing sheet P, the page image with the lowest page number is referred to as the first page image, the page image following the first page image is referred to as the second page image, the page image following the second page image is referred to as the third page image, and the page image following the third page image is referred to as the fourth page image.

As shown in FIG. 10, when receiving a print job, the controller 100 determines whether the number of pages of page images contained in the print data of the print job is a multiple of 4 (i.e., 2n) in S1. When the number of pages is a multiple of 4 (S1: YES), the process proceeds to the first printing process (S2). The first printing process (S2) represents the printing method when the number of page images to be printed on the printing sheet P is 4.

Referring to FIG. 11, the first printing process (S2) is described. As shown in FIG. 11, the controller 100 controls the sheet feed motor 107 and the conveying motor 108 to start conveying the printing sheets P stored in the sheet feed tray 21 (S11). As S11 is executed, the printing sheet P is conveyed to the print engine 3.

Next, the controller 100 controls the print engine 3 to print the page image of the second page in the first print area F1 on the front surface of the printing sheet P (S12). After S12, the controller 100 controls the print engine 3 to print the page image of the fourth page in the second print area on the front surface of the printing sheet P (S13). It is noted that the process from S11 to S13 is an example of a first conveying process according to the present disclosures.

Next, the controller 100 controls the conveying motor 108 to convey the printing sheet P in the second conveying direction D2 (S14). Then, the controller 100 controls the print engine 3 to print the page image of the third page in the third print area F3 on the back surface of the printing sheet P (S15). After S15, the controller 100 controls the cutting mechanism 10 to cut the printing sheet P at the cutting position CL (S16). It should be noted that S16 is an example of a second cutting process according to the present disclosures. Thereafter, the controller 100 discharges the first printing sheet P1, from among the first printing sheet P1 and the second printing sheet P2 which are divided from the printing sheet P by cutting the same in S15, to the discharge tray 22 (S17).

Next, the controller 100 prints the page image of the first page on the fourth print area F4 on the back surface of the printing sheet P (S18). It should be noted that the process from step S14 to step S18 is an example of a second conveying process according to the present disclosures. After S18, the controller 100 discharges the second printing sheet P2 to the discharge tray 22 (S19). It should be noted that processes in S17 and S19 are examples of a discharging process according to the present disclosures. After S19, the first printing process (S2) is terminated. The process then returns to FIG. 10, and proceeds to S8 after execution of the first printing process (S2). Details of S8 will be described later.

As shown in FIG. 10, when the number of pages is not a multiple of 4 (S1: NO), the process proceeds to S3. In S3, the controller 100 determines whether the remainder is 3 when the number of pages of page images included in the print data of the print job is divided by 4. When the remainder of the number of pages divided by 4 is 3 (S3: YES), the process proceeds to the second printing process (S4). The second printing process (S4) corresponds to the printing method when the number of page images to be printed on the printing sheet P is 3.

Referring to FIG. 12, the second printing process (S4) is described. As shown in FIG. 12, the controller 100 controls the sheet feed motor 107 and the conveying motor 108 to start conveying the printing sheets P accommodated in the sheet feed tray 21 (S21). S21 is the same process as S11 described above.

Next, the controller 100 controls the print engine 3 to print the page image of the third page in the first print area F1 on the front surface of the printing sheet P (S22). In S22, a page image of an odd-numbered page is printed in the first print area F1. After S22, the controller 100 controls the cutting mechanism 10 to cut the printing sheet P at the cutting position CL (S23). It should be noted that S23 is an example of the first cutting process according to the present disclosures. Then, the controller 100 discharges the first printing sheet P1, from among the first printing sheet P1 and the second printing sheet P2 which are divided by dividing the printing sheet P in S23, to the discharge tray 22 (S24).

Next, the controller 100 controls the print engine 3 to print the page image of the second page in the second print area F2 on the front surface of the printing sheet P (S25). It should be noted that the process of from S21 to S25 is an example of the first conveying process according to the present disclosures. Next, the controller 100 controls the conveying motor 108 to convey the second printing sheet P2 in the second conveying direction D2 (S26). In S26, the second printing sheet P2 is switched back and conveyed in the second conveying direction D2.

Then, the controller 100 controls the print engine 3 to print the page image of the first page in the third print area F3 on the back surface of the printing sheet P (S27). It should be noted that the process from step S26 to S27 is an example of a second conveying process according to the present disclosures. After S27, the controller 100 discharges the second printing sheet P2 to the discharge tray 22 (S28). The processes in S24 and S28 are examples of a discharging process according to the present disclosures. After S28, the second printing process (S4) is terminated. Returning to FIG. 10, after the second printing process (S4), the process proceeds to S8, which is described later.

As shown in FIG. 10, when the remainder obtained by dividing the number of pages by 4 is not 3 (S3: NO), the process goes to S5. In S5, the controller 100 determines whether the remainder when the number of pages of page images included in the print data of the print job is divided by 4 is 2. When the remainder of the number of pages divided by 4 is 2 (S5: YES), the process proceeds to the third printing process (S6). The third printing process (S6) corresponds to the printing method when the number of page images to be printed on the printing sheet P is 2.

Referring to FIG. 13, the third printing process (S6) is described. As shown in FIG. 13, the controller 100 controls the sheet feed motor 107 and the conveying motor 108 to start conveying the printing sheets P accommodated in the sheet feed tray 21 (S31). In S31, the printing sheet P is conveyed so that the cutting position CL of the printing sheet P is positioned at a cutting position X in the cutting mechanism 10. The page image is not printed on the first print area F1 of the printing sheet P.

Next, the controller 100 controls the cutting mechanism 10 to cut the printing sheet P at the cutting position CL (S32). S32 is an example of the first cutting process according to the present disclosures. Then, the controller 100 discharges the first printing sheet P1, from among the first printing sheet P1 and the second printing sheet P2 which are divided by cutting the printing sheet P in S32, to the discharge tray 22 (S33). Next, the controller 100 controls the print engine 3 to print the page image of the second page in the second print area F2 on the front surface of the printing sheet P (S34). It should be noted that the process from S31 to S34 is an example of the first conveyance process according to the present disclosures.

Next, the controller 100 controls the conveying motor 108 to convey the second printing sheet P2 in the second conveying direction D2 (S35). S35 is similar to S26 of the second printing process (S4). Next, the controller 100 controls the print engine 3 to print the page image of the first page in the third print area F3 on the back surface of the printing sheet P (S36). It should be noted that the process from S35 to S36 is an example of the second conveyance process according to the present disclosures. After S36, the controller 100 discharges the second printing sheet P2 to the discharge tray 22 (S37). It should be noted that the processes in S33 and S37 are examples of the discharging process according to the present disclosures. After S37, the third printing process (S6) is terminated. Returning to FIG. 10, after the third printing process (S6), the process proceeds to S8, which is described later.

As shown in FIG. 10, when the remainder of the number of pages divided by 4 is not 2 (S5: NO), the process proceeds to the fourth printing process (S7). The fourth printing process (S7) corresponds to the printing method when the number of page images to be printed on the printing sheet P is 1.

Referring to FIG. 14, the fourth printing process (S7) is described. As shown in FIG. 14, the controller 100 first controls the sheet feed motor 107 and the conveying motor 108 to start conveying the printing sheet P accommodated in the sheet feed tray 21 (S41). Next, the controller 100 controls the cutting mechanism 10 to cut the printing sheet P at the cutting position CL (S42). It should be noted that S42 is an example of the first cutting process according to the present disclosures. Then, the controller 100 discharges the first printing sheet P1, from among the first printing sheet P1 and the second printing sheet P2, which were divided from the printing sheet by cutting the same in S42, to the discharge tray 22 (S43).

Next, the controller 100 controls the print engine 3 to print the page image of the first page in the second print area F2 on the front surface of the printing sheet P (S44). It should be noted that the process from S41 to S44 is an example of the first conveying process according to the present disclosures. After S44, the controller 100 discharges the second printing sheet P2 to the discharge tray 22 (S45). It should be noted that the processes in S43 and S45 are examples of the discharging process according to the present disclosures. After S45, the fourth print process (S7) is terminated. Returning to FIG. 10, after the fourth printing process (S7), the process proceeds to step S8.

As shown in FIG. 10, the controller 100 determines whether all page images in the print data have been printed (S8). When all the page images have not been printed (S8: NO), the controller 100 performs the first printing process (S2). When all the page images have been printed (S8: YES), the controller 100 terminates the process.

According to the above configuration, for the first printing sheet P and the second printing sheet P2 that have been cut and do not require page images to be printed on the back surface, they can be discharged to the discharge tray 22 without performing the second conveying process. On the other hand, for the first printing sheet P1 and the second printing sheet P2 that have been cut and need to have page images printed on the back surface, the second conveying process can be executed. Therefore, it is possible to reduce the conveying amount for the first printing sheet P1 and the second printing sheet P2 after the cutting, which do not need to have the page image printed on the back surface. Thus, it is possible to shorten the time for the duplex reverse order printing.

Realization with Use of Software

The functions of the printing apparatus 1 (hereinafter referred to as an "apparatus") can be realized by computer-executable instructions for causing a computer to function as each control block of the apparatus (especially the components included in the controller 100).

In such a case, the above apparatus is equipped with a computer having at least one controller (e.g., a processor) and at least one storage device (e.g., a memory) as hardware configured to execute the above program (i.e., instructions). By executing the above program (i.e., instructions) with the controller and the memory device, each function described above can be realized.

The above program (i.e., instructions) may be stored in one or more computer-readable non-transitory storage media. The recording media may or may not be provided by the above apparatus. In the latter case, the above program (i.e., instructions) may be supplied to the above apparatus via any transmission medium, wired or wireless.

Further, it is also possible to realize some or all of the functions of each of the above control blocks by means of logic circuits. For example, an integrated circuit in which a logic circuit functioning as each of the above control blocks is formed is also included according to aspects of the present disclosures. In addition, it is also possible to realize the functions of each of the above control blocks by, for example, a quantum computer.

The present disclosures are not limited to the above-mentioned configurations, and various modifications are possible within the scope of the claims, and the disclosures obtained by combining technical means disclosed above as appropriate are also included in aspects of the present disclosures.

What is claimed is:

1. A printing apparatus comprising:

an image printer configured to print a page image on a printing medium based on print data including a plurality of pieces of image data, each of the plurality of image data indicating a page image;

a first conveying mechanism configured to convey the printing medium on which the page image is printed in a first conveying direction, the first conveying direction being a direction the printing medium is discharged to a discharge part;

a second conveying mechanism configured to convey the printing medium in a second conveying direction opposite to the first conveying direction;

a cutting mechanism arranged on a downstream side of the image printer, the cutting mechanism being configured to cut the printing medium into n equal pieces, the n being an integer equal to or more than 2; and a controller, wherein the controller is configured to perform:

a first conveying process of causing the first conveying mechanism to convey the printing medium in the first conveying direction to print the page image on a front surface of the printing medium;

a second conveying process of causing the second conveying mechanism to convey the printing medium in the second conveying direction to print the page image on a back surface of the printing medium after the first conveying process;

an image printing process of causing the image printer to print the page images on each of the front surface and the back surface and causing the first conveying mechanism to discharge the printing medium to the discharge part with page numbers decreasing sequentially as the printing medium is discharged in such a manner that page images printed on the printing medium cut by the cutting mechanism and stacked in the discharge part are arranged in a page number order specified by the print data; and a first cutting process of, while the first conveying process, causing the cutting mechanism to cut the printing medium on which a last page image corresponding to a last page number of the print data is to be printed when a number of pages of the page images included in the print data is not divisible by 2n.

2. The printing apparatus according to claim 1, wherein, the controller is configured to perform:

a second cutting process of, while the second conveying process, causing the cutting mechanism to cut a printing medium subsequent to the printing medium on which the last page image is to be printed into n equal pieces when the number of pages is equal to or larger than 2n+1.

3. The printing apparatus according to claim 2, wherein the controller is configured to perform:

a discharging process of causing the first conveying mechanism to discharge the printing medium cut by the first cutting mechanism to the discharge part, wherein, in the image printing process, the controller is configured to cause the image printer to print the last page image on a front surface of a portion corresponding to a n-th discharged printing medium after cut by the cutting mechanism, and wherein, in the discharging process, the printing medium cut into n equal pieces by the first cutting process is discharged without the second conveying process being performed.

4. The printing apparatus according to claim 1, wherein, in the image printing process, the controller is configured to cause the image printer to print the last page image on a front surface of the printing medium.

5. The printing apparatus according to claim 4, wherein, in a case where the number of pages to be printed on the printing medium is two, in the image printing process, the controller is configured to cause the image printer to print the last page image on a front surface of a portion corresponding to a n-th discharged printing medium on which the last page image is to be printed after cut by the cutting mechanism.

6. The printing apparatus according to claim 5, wherein the controller is configured to perform:

a discharging process of causing the first conveying mechanism to discharge the printing medium cut by the first cutting mechanism to the discharge part, wherein, in the discharging process, the n-th discharged printing medium is discharged after the second conveying mechanism is performed.

7. The printing apparatus according to claim 4, wherein, in a case where the number of pages to be printed on the printing medium is three, in the image printing process, the controller is configured to cause the image printer to:

print the last page image on a front surface of a portion corresponding to a n−1-th discharged printing medium on which the last page image is to be printed after cut by the cutting mechanism; and print the page image one page before the last page image on a front surface of a portion corresponding to a n-th discharged printing medium on which the last page image is to be printed after cut by the cutting mechanism.

8. The printing apparatus according to claim 7, wherein the controller is configured to perform:

a discharging process of causing the first conveying mechanism to discharge the printing medium cut by the first cutting mechanism to the discharge part, wherein, in the discharging process, the n-th discharged printing medium is discharged after the second conveying mechanism is performed.

9. The printing apparatus according to claim 1, wherein the controller is configured to perform:

a discharging process of causing the first conveying mechanism to discharge the printing medium cut by the first cutting mechanism to the discharge part, wherein, in the discharging process, when the page image is not printed on a front surface of the printing medium cut by the first cutting process, the printing medium is discharged without the second conveying process being performed.

10. The printing apparatus according to claim 1, wherein, in a case where the page image corresponding to a last page number among the plurality of image data included in the print data is a blank page image, in the image printing process, the controller is configured to print the page image on the printing medium assuming that the page image of the page number one page before the blank page image is the last page image.

11. A control method of a printing apparatus printing apparatus including an image printer configured to print a page image on a printing medium based on print data including a plurality of pieces of image data, each of the plurality of image data indicating a page image, a first conveying mechanism configured to convey the printing medium on which the page image is printed in a first conveying direction, the first conveying direction being a direction the printing medium is discharged to a discharge part, a second conveying mechanism configured to convey the printing medium in a second conveying direction opposite to the first conveying direction, a cutting mechanism arranged on a downstream side of the image printer, the cutting mechanism being configured to cut the printing medium into n equal pieces, the n being an integer equal to or more than 2, and a controller, wherein the control method comprises:

a first conveying process of causing the first conveying mechanism to convey the printing medium in the first conveying direction to print the page image on a front surface of the printing medium;

a second conveying process of causing the second conveying mechanism to convey the printing medium in the second conveying direction to print the page image on a back surface of the printing medium after the first conveying process;

an image printing process of causing the image printer to print the page images on each of the front surface and the back surface and causing the first conveying mechanism to discharge the printing medium to the discharge part with page numbers decreasing sequentially as the printing medium is discharged in such a manner that page images printed on the printing medium cut by the cutting mechanism and stacked in the discharge part are arranged in a page number order specified by the print data; and a first cutting process of, while the first conveying process, causing the cutting mechanism to cut the printing medium on which a last page image corresponding to a last page number of the print data is to be printed when a number of pages of the page images included in the print data is not divisible by 2n.

12. A non-transitory computer-readable storage medium for a printing apparatus printing apparatus including an image printer configured to print a page image on a printing medium based on print data including a plurality of pieces of image data, each of the plurality of image data indicating a page image, a first conveying mechanism configured to convey the printing medium on which the page image is printed in a first conveying direction, the first conveying direction being a direction the printing medium is discharged to a discharge part, a second conveying mechanism configured to convey the printing medium in a second conveying direction opposite to the first conveying direction, a cutting mechanism arranged on a downstream side of the image printer, the cutting mechanism being configured to cut the printing medium into n equal pieces, the n being an integer equal to or more than 2, and a controller, the non-transitory computer-readable storage medium containing computer-executable instructions which cause, when executed by the controller, the printing apparatus to perform:

causing the first conveying mechanism to convey the printing medium in the first conveying direction to print the page image on a front surface of the printing medium;

causing the second conveying mechanism to convey the printing medium in the second conveying direction to print the page image on a back surface of the printing medium after the first conveying process;

causing the image printer to print the page images on each of the front surface and the back surface and causing the first conveying mechanism to discharge the printing medium to the discharge part with page numbers decreasing sequentially as the printing medium is discharged in such a manner that page images printed on the printing medium cut by the cutting mechanism and stacked in the discharge part are arranged in a page number order specified by the print data; and causing the cutting mechanism to cut the printing medium on which a last page image corresponding to a last page number of the print data is to be printed while the first conveying process when a number of pages of the page images included in the print data is not divisible by 2n.

* * * * *